United States Patent
Kim et al.

(10) Patent No.: US 12,501,351 B2
(45) Date of Patent: Dec. 16, 2025

(54) PROCESSING OF NSSAI REJECTED DUE TO NSSAA FAILURE

(71) Applicant: LG ELECTRONICS INC., Seoul (KR)

(72) Inventors: Sunhee Kim, Seoul (KR); Hyunsook Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 459 days.

(21) Appl. No.: 18/015,431

(22) PCT Filed: Jul. 7, 2021

(86) PCT No.: PCT/KR2021/008651
§ 371 (c)(1),
(2) Date: Aug. 3, 2023

(87) PCT Pub. No.: WO2022/014944
PCT Pub. Date: Jan. 20, 2022

(65) Prior Publication Data
US 2023/0397092 A1    Dec. 7, 2023

(30) Foreign Application Priority Data
Jul. 14, 2020   (KR) .................. 10-2020-0086952

(51) Int. Cl.
*H04W 48/16*   (2009.01)
*H04W 12/06*   (2021.01)
(Continued)

(52) U.S. Cl.
CPC ........... *H04W 48/16* (2013.01); *H04W 12/06* (2013.01); *H04W 48/18* (2013.01); *H04W 60/00* (2013.01)

(58) Field of Classification Search
CPC ..... H04W 48/16; H04W 48/18; H04W 12/06; H04W 60/00; H04W 60/04
See application file for complete search history.

(56) References Cited

U.S. PATENT DOCUMENTS 11,516,762 B2 * 11/2022 Jeong .................... H04W 60/00
2019/0007500 A1   1/2019 Kim et al.
(Continued)

FOREIGN PATENT DOCUMENTS

KR   10-2018-0047172 A   5/2018
KR   10-2019-0018707 A   2/2019
(Continued)

OTHER PUBLICATIONS

International Search Report from PCT/KR2021/008651, dated Oct. 13, 2021.
(Continued)

*Primary Examiner* — Lester G Kincaid
(74) *Attorney, Agent, or Firm* — BRYAN CAVE LEIGHTON PAISNER LLP

(57) ABSTRACT

Provided are a method and a device for processing network slice selection assistance information (NSSAI) rejected due to a network slice-specific authentication and authorization (NSSAA) failure. A user equipment (UE) receives a UE configuration update command message from an access and mobility management function (AMF). On the basis of failure of NSSAA with respect to single NSSAI (S-NSSAI0, the UE configuration update command message includes time information related to a timer. The UE adds the S-NSSAI to a rejected NSSAI, starts the timer on the basis of the time information, and deletes the S-NSSAI included in the rejected NSSAI after the timer expires.

14 Claims, 15 Drawing Sheets

(51) Int. Cl.
*H04W 48/18* (2009.01)
*H04W 60/00* (2009.01)

(56) References Cited

U.S. PATENT DOCUMENTS

| | | | | |
|---|---|---|---|---|
| 2020/0162919 | A1* | 5/2020 | Velev | H04W 60/00 |
| 2020/0229079 | A1* | 7/2020 | Lee | H04W 48/02 |
| 2022/0256439 | A1* | 8/2022 | Casati | H04W 48/18 |
| 2022/0295279 | A1* | 9/2022 | Kuge | H04W 12/08 |

FOREIGN PATENT DOCUMENTS

| | | |
|---|---|---|
| KR | 10-2019-0082897 A | 7/2019 |
| WO | 2020/099931 A1 | 5/2020 |

OTHER PUBLICATIONS

Section 4.2.9 of "3rd Generation Partnership Project; Technical Specification Group Services Aspects; Procedures for the 5G System (5GS); Stage 2 (Release 16)", 3GPP TS 23.502 v16.4.0 (Mar. 2020).

"3rd Generation Partnership Project; Technical Specification Group Services and System Aspects; Procedures for the 5G System (5GS); Stage 2 (Release 16)", 3GPP TS 23.502 V16.5.0 (Jul. 2020), see sections 4.2.2.2, 4.2.4.2, 4.2.9.1 and 4.2.9.2; and figures 4.2.2.2.2-1, 4.2.4.2-1 and 4.2.9.2-1.

"3rd Generation Partnership Project; Technical Specification Group Services and System Aspects; System architecture for the 5G System (5GS); Stage 2 (Release 16)", 3GPP TS 23.501 V16.5.0 (Jul. 2020), see sections 5.15-5.15.10.

Section 4.2.2.2, "3rd Generation Partnership Project; Technical Specification Group Services and System Aspects; Procedures for the 5G System (5GS); Stage 2 (Release 16)", 3GPP TS 23.502 V16.3.0 (Dec. 2019).

Section 4.6, Section 4.6.2.2 and Section 5.5.1.2.5, "3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1 (Mar. 2020).

Section 4.2.9, "3rd Generation Partnership Project; Technical Specification Group Services and System Aspects; Procedures for the 5G System (5GS); Stage 2 (Release 16)", 3GPP TS 23.502 V16.14.0 (Sep. 2022).

* cited by examiner

PROCESSING OF NSSAI REJECTED DUE TO NSSAA FAILURE

CROSS REFERENCE TO RELATED APPLICATIONS

This application is the National Stage filing under 35 U.S.C. 371 of International Application No. PCT/KR2021/008651, filed on Jul. 7, 2021, which claims the benefit of Korean Patent Application No. 10-2020-0086952, filed on Jul. 14, 2020, which is hereby incorporated by reference herein in its entirety.

TECHNICAL FIELD

The present disclosure relates to processing of rejected network slice selection assistance information (NSSAI) due to a network slice-specific authentication and authorization (NSSAA) failure.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A network slice refers to a logical network that provides specific network capabilities and network characteristics. More specifically, a network slice is a network structure that enables multiplexing of virtualized independent logical networks in the same physical network infrastructure. Each network slice is a separate end-to-end network tailored to meet the various requirements requested by a specific application. The network slice enables various services to be provided to various terminals with different properties.

SUMMARY

A network slice-specific authentication and authorization (NSSAA) procedure may be performed for a specific network slice. Until specific conditions are satisfied, data cannot be transmitted through the network slice for which the NSSAA procedure has failed. However, there may exist a kind of device that is inherently difficult to satisfy the above specific conditions. In addition, when the failure of the NSSAA procedure is temporary, even though the NSSAA procedure is highly likely to succeed after a certain period of time, the NSSAA procedure may be performed only after the specific conditions are satisfied.

In an aspect, a method performed by a user equipment (UE) operating in a wireless communication system is provided. The UE receives a UE configuration update command message from an access and mobility management function (AMF). The UE configuration update command message includes time information related to a timer based on failure of a network slice-specific authentication and authorization (NSSAA) for single network slice selection assistance information (S-NSSAI). The UE adds the S-NSSAI to a rejected NSSAI, starts the timer based on the time information, and after the timer expires, deletes the S-NSSAI included in the rejected NSSAI.

In another aspect, an apparatus for implementing the above method is provided.

The present disclosure can have various advantageous effects.

For example, for a UE that is difficult to recover from errors by initializing the UE itself because it is difficult to turn off the power or release the USIM due to the nature of the device, error recovery can be possible for S-NSSAI rejected due to temporary NSSAA failure.

For example, even if NSSAA fails once, since the rejected S-NSSAI can be used again after a certain time, data transmission can be possible using the S-NSSAI for which NSSAA failed once without moving to a new PLMN.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
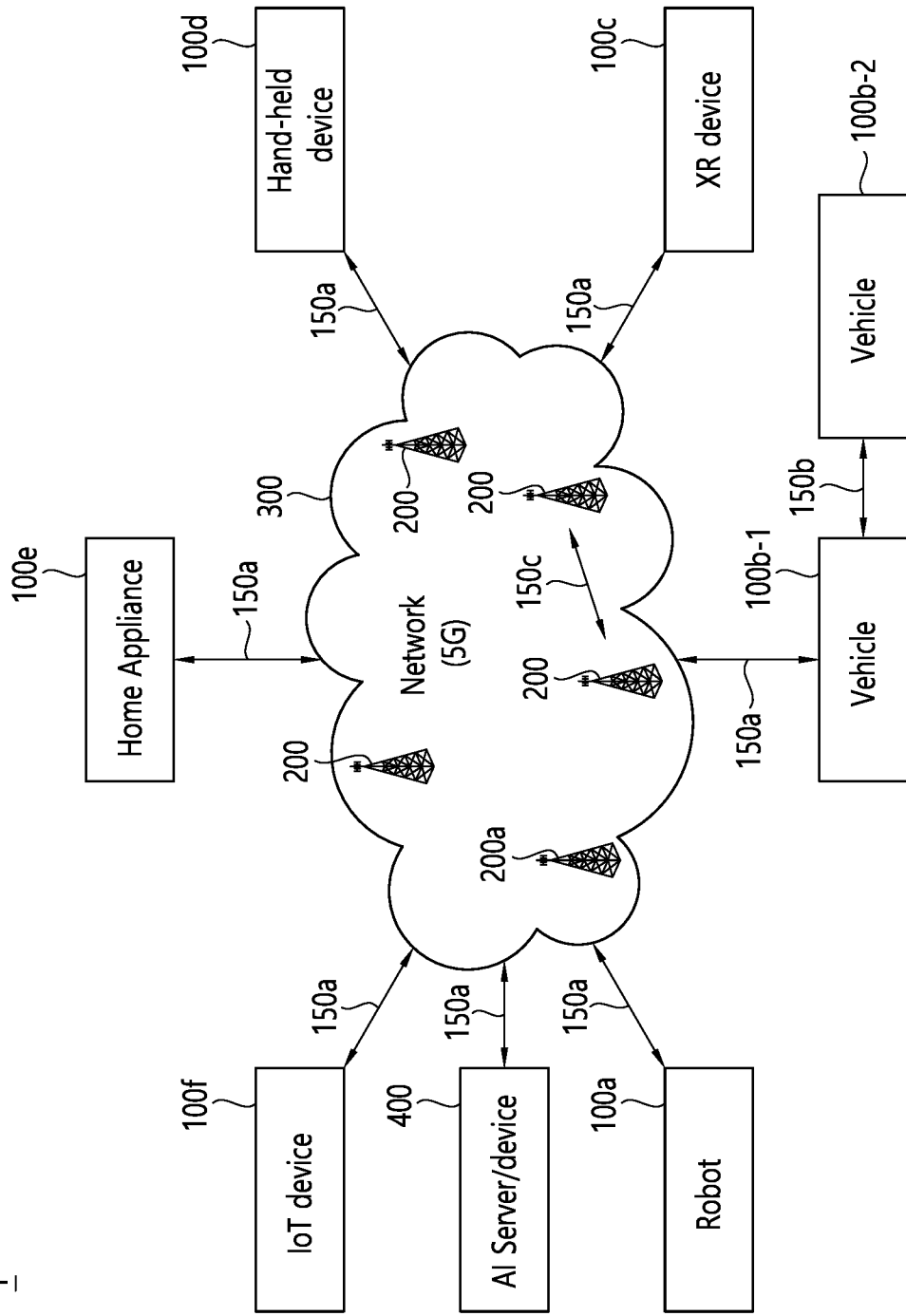
FIG. 1 shows an example of a communication system to which implementations of the present disclosure are applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure are applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set.

The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
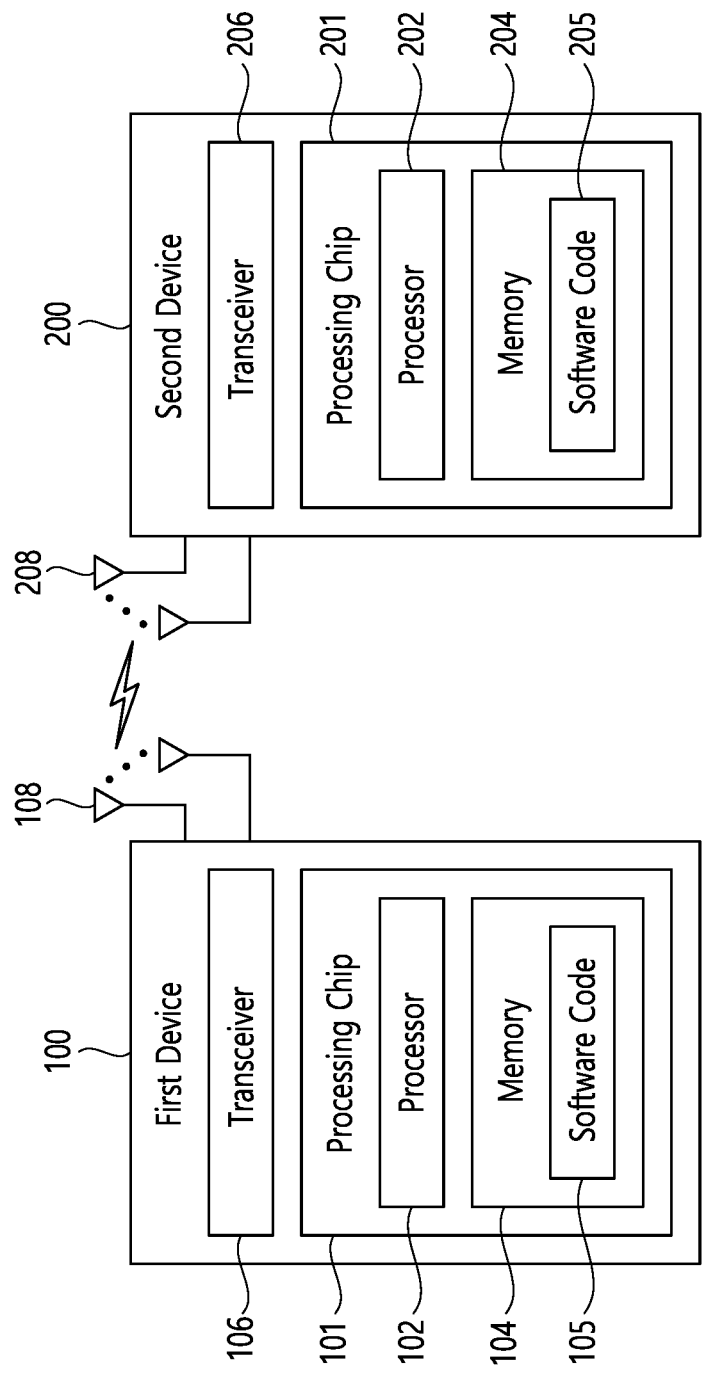
FIG. 2 shows an example of wireless devices to which implementations of the present disclosure are applied.

FIG. 2 shows an example of wireless devices to which implementations of the present disclosure are applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
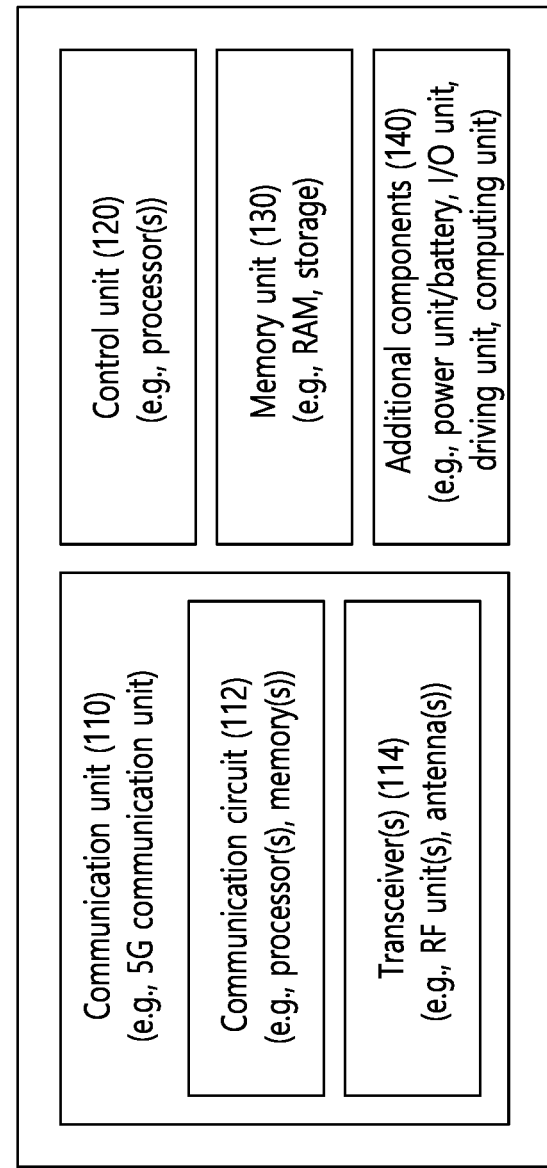
FIG. 3 shows an example of a wireless device to which implementations of the present disclosure are applied.

FIG. 3 shows an example of a wireless device to which implementations of the present disclosure are applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a dynamic RAM (DRAM), a ROM, a flash memory, a volatile memory, a non-volatile memory, and/or a combination thereof.

Figure 4:
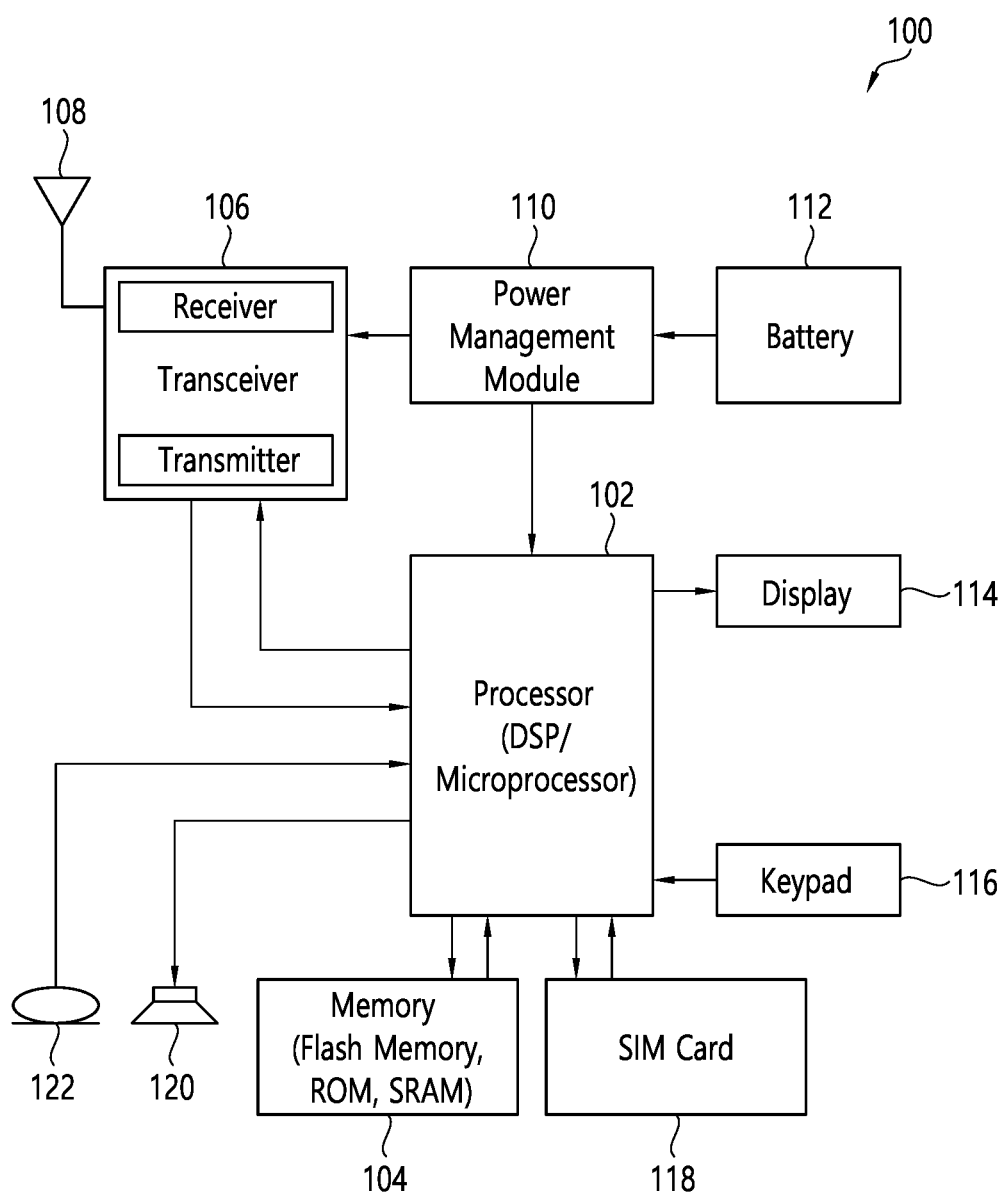
FIG. 4 shows an example of UE to which implementations of the present disclosure are applied.

FIG. 4 shows an example of UE to which implementations of the present disclosure are applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel© or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
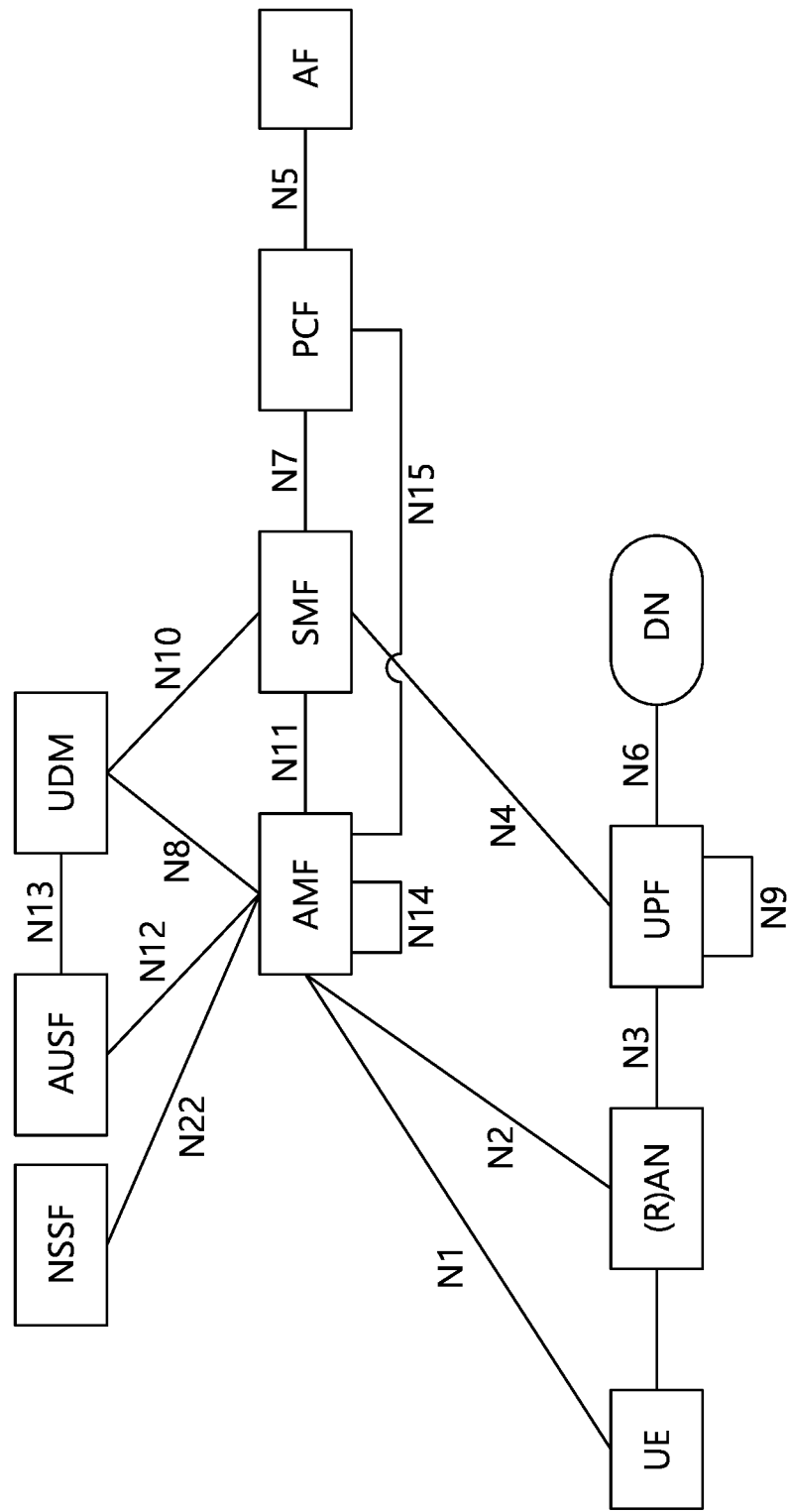
FIG. 5 shows an example of 5G system architecture to which implementations of the present disclosure are applied.

FIG. 5 shows an example of 5G system architecture to which implementations of the present disclosure are applied.

The 5G system (5GS) architecture consists of the following network functions (NF).

Authentication Server Function (AUSF)
    Access and Mobility Management Function (AMF)
    Data Network (DN), e.g., operator services, Internet access or 3rd party services
    Unstructured Data Storage Function (UDSF)
    Network Exposure Function (NEF)
    Intermediate NEF (I-NEF)
    Network Repository Function (NRF)
    Network Slice Selection Function (NSSF)
    Policy Control Function (PCF)
    Session Management Function (SMF)
    Unified Data Management (UDM)
    Unified Data Repository (UDR)
    User Plane Function (UPF)
    UE radio Capability Management Function (UCMF)
    Application Function (AF)
    User Equipment (UE)
    (Radio) Access Network ((R)AN)
    5G-Equipment Identity Register (5G-EIR)
    Network Data Analytics Function (NWDAF)
    CHarging Function (CHF)

Furthermore, the following network functions may be considered.

Non-3GPP InterWorking Function (N3IWF)
    Trusted Non-3GPP Gateway Function (TNGF)
    Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.
    N2: Reference point between the (R)AN and the AMF.
    N3: Reference point between the (R)AN and the UPF.
    N4: Reference point between the SMF and the UPF.
    N6: Reference point between the UPF and a Data Network.
    N9: Reference point between two UPFs.

The following reference points show the interactions that exist between the NF services in the NFs.

N5: Reference point between the PCF and an AF.
N7: Reference point between the SMF and the PCF.
N8: Reference point between the UDM and the AMF.
N10: Reference point between the UDM and the SMF.
N11: Reference point between the AMF and the SMF.
N12: Reference point between the AMF and the AUSF.
N13: Reference point between the UDM and the AUSF.
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N22: Reference point between the AMF and the NSSF.

In some cases, a couple of NFs may need to be associated with each other to serve a UE.

A registration procedure is described. Section 4.2.2.2 of 3GPP TS 23.502 V16.3.0 (2019-12) can be referred.

Figure 6:
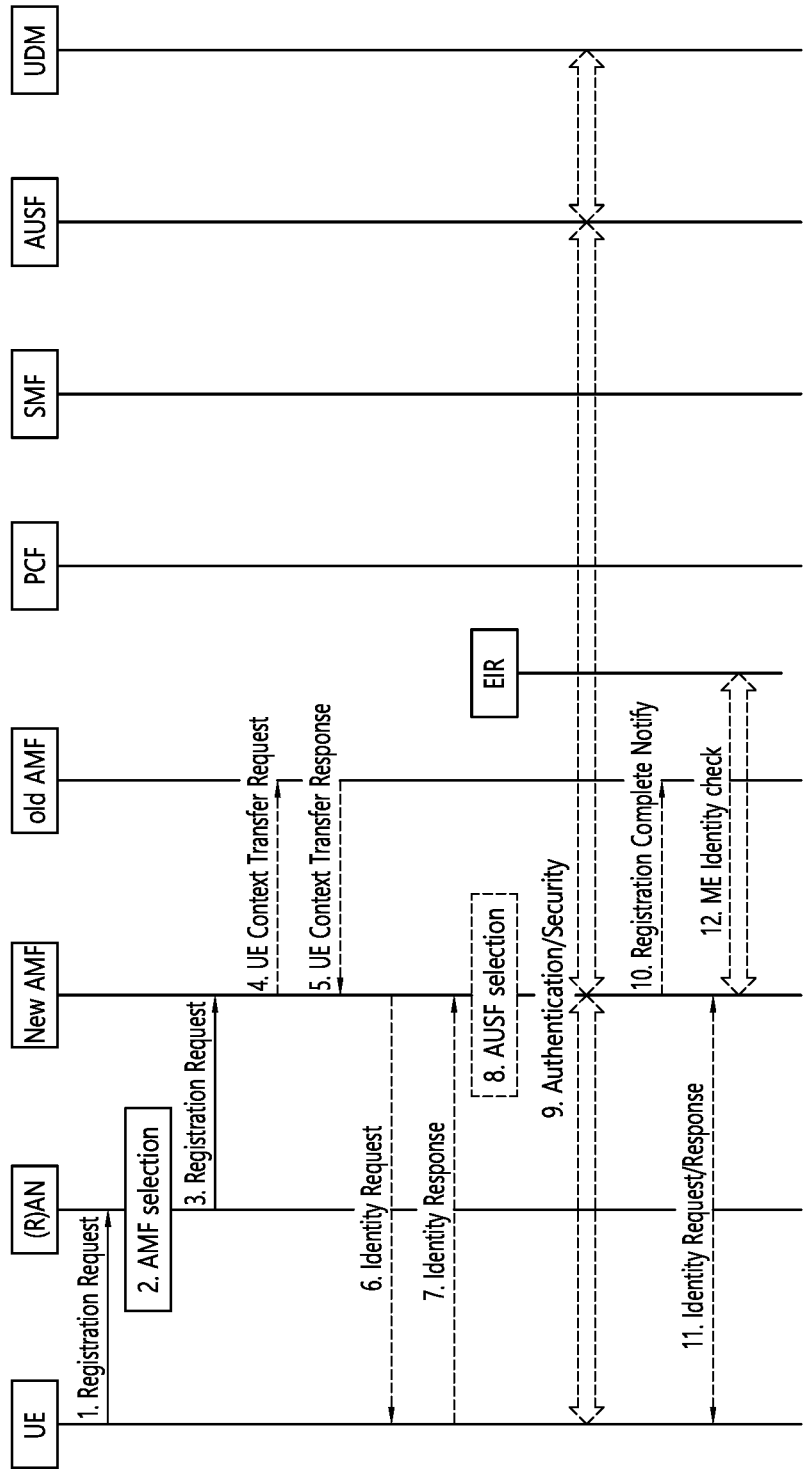
FIGS. 6 and 7 show an example of a registration procedure to which implementations of the present disclosure are applied.
Figure 7:
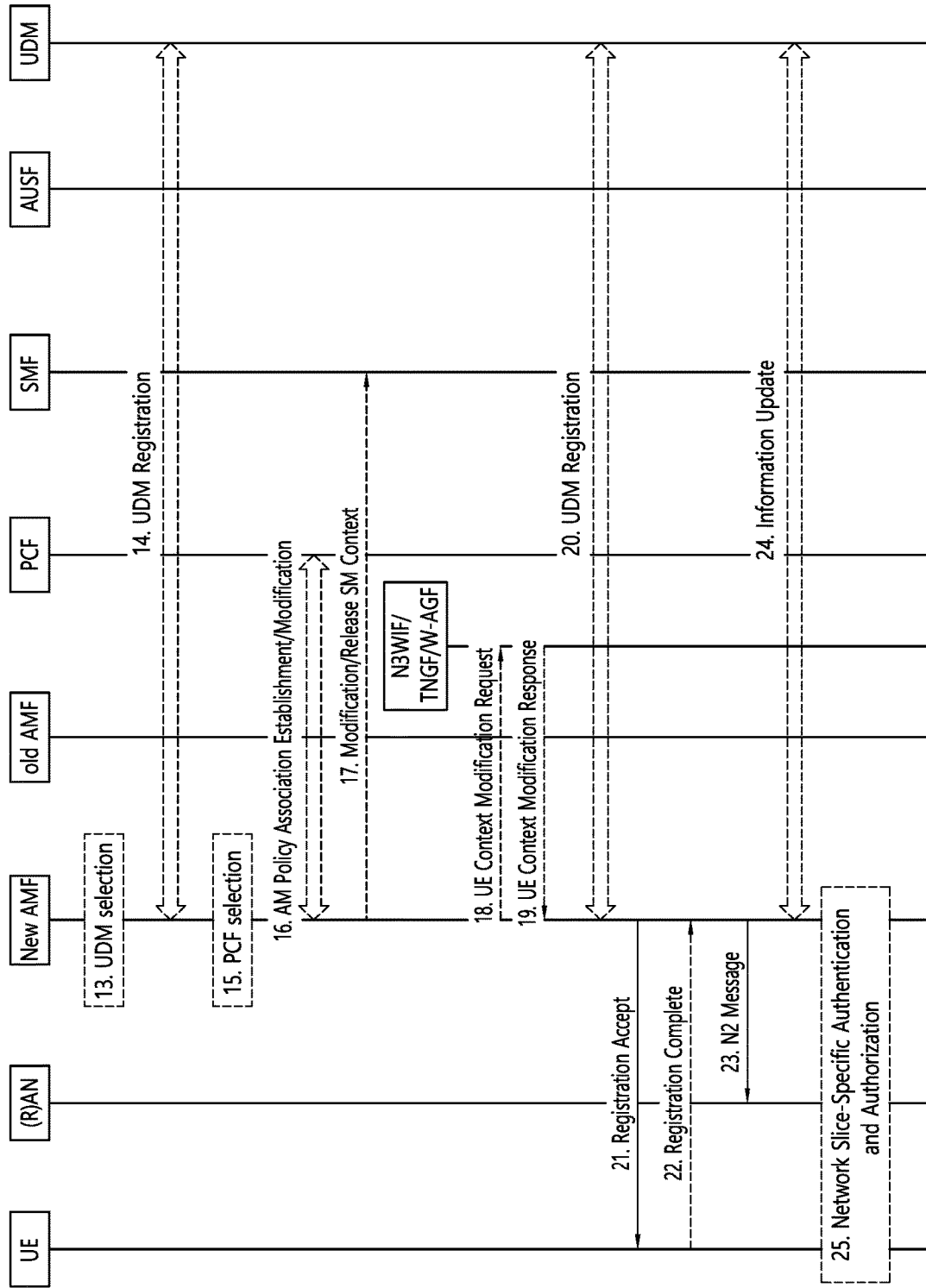

FIGS. 6 and 7 show an example of a registration procedure to which implementations of the present disclosure are applied.

A UE needs to register with the network to get authorized to receive services, to enable mobility tracking and to enable reachability. The UE initiates the registration procedure using one of the following registration types:

Initial registration to the 5GS; or
Mobility registration update; or
Periodic registration update; or
Emergency registration.

The general registration procedure in FIGS. 6 and 7 applies on all these registration procedures, but the periodic registration update need not include all parameters that are used in other registration cases.

The general registration procedure in FIGS. 6 and 7 is also used for the case of registration in 3GPP access when the UE is already registered in a non-3GPP access, and vice versa. Registration in 3GPP access when the UE is already registered in a non-3GPP access scenario may require an AMF change.

First, procedures of FIG. 6 are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGISTERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.
ii) a native 5G-GUTI assigned by the PLMN to which the UE is attempting to register, if available;
iii) a native 5G-GUTI assigned by an equivalent PLMN to the PLMN to which the UE is attempting to register, if available;
iv) a native 5G-GUTI assigned by any other PLMN, if available.
v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIG. 7, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSMContext and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization (NSSAA) procedure.

Network slicing is described. Section 4.6 of 3GPP TS 24.501 V16.4.1 can be referred.

The 5GS supports network slicing. Within a PLMN or Stand-alone Non-Public Network (SNPN), a network slice is identified by an S-NSSAI, which is comprised of a slice/service type (SST) and a slice differentiator (SD). Inclusion of an SD in an S-NSSAI is optional. A set of one or more S-NSSAIs is called the NSSAI. The following NSSAIs may be defined.
 a) Configured NSSAI;
 b) Requested NSSAI;
 c) Allowed NSSAI;
 d) Subscribed S-NSSAIs; and
 e) Pending NSSAI.

The following NSSAIs may also be defined.
 a) rejected NSSAI for the current PLMN or SNPN;
 b) rejected NSSAI for the current registration area; and
 c) rejected NSSAI for the failed or revoked NSSAA.

In case of a PLMN, a serving PLMN may configure a UE with the configured NSSAI per PLMN. In addition, the HPLMN may configure a UE with a single default configured NSSAI and consider the default configured NSSAI as valid in a PLMN for which the UE has neither a configured NSSAI nor an allowed NSSAI. In case of an SNPN, the SNPN may configure a UE with a configured NSSAI applicable to the SNPN.

The allowed NSSAI and rejected NSSAI for the current registration area are managed per access type independently, i.e., 3GPP access or non-3GPP access, and is applicable for the registration area. If the registration area contains tracking area IDs (TAIs) belonging to different PLMNs, which are equivalent PLMNs, the allowed NSSAI and the rejected NSSAI for the current registration area are applicable to these PLMNs in this registration area.

The allowed NSSAI that is associated with a registration area containing TAIs belonging to different PLMNs, which are equivalent PLMNs, can be used to form the requested NSSAI for any of the equivalent PLMNs when the UE is outside of the registration area where the allowed NSSAI was received.

When the NSSAA procedure is to be initiated for one or more S-NSSAIs in the requested NSSAI, these S-NSSAI(s) may be included in the pending NSSAI. When the NSSAA procedure is completed for an S-NSSAI that has been in the pending NSSAI, the S-NSSAI may be moved to the allowed NSSAI or rejected NSSAI depending on the outcome of the NSSAA procedure and communicated to the UE. The pending NSSAI is managed regardless of access type, i.e., the pending NSSAI is applicable to both 3GPP access and non-3GPP access even if sent over only one of the accesses.

The rejected NSSAI for the current PLMN or SNPN is applicable for the whole registered PLMN or SNPN. The AMF shall only send a rejected NSSAI for the current PLMN when the registration area consists of TAIs that only belong to the registered PLMN. If the UE receives a rejected NSSAI for the current PLMN, and the registration area also contains TAIs belonging to different PLMNs, the UE shall treat the received rejected NSSAI for the current PLMN as applicable to the whole registered PLMN.

The rejected NSSAI for the failed or revoked NSSAA includes one or more S-NSSAIs for which the NSSAA have been failed or revoked, and are applicable for the whole registered PLMN or SNPN.

NSSAI storage is described. Section 4.6.2.2 of 3GPP TS 24.501 V16.4.1 can be referred.

In general, the configured NSSAI is the subscription NSSAI of the UE when the UE accesses the HPLMN, and continues to be the same as long as the subscriber information of the UE does not change. However, an existing S-NSSAI may be created as a configured NSSAI due to a change in subscriber information, etc., or a specific S-NSSAI may be removed. Thereafter, the AMF may inform the UE of the updated S-NSSAI to the current access network.

In addition, the UE may store and store the NSSAI configured for the network visited by the UE in the non-volatile memory. Therefore, when the UE selects a new VPLMN, there may be NSSAI information configured in the previously visited network. Therefore, when performing PLMN selection, the UE may have the configured NSSAI information of the PLMN selected by the UE.

In addition, if there is a service level agreement (SLA) between the HPLMN and the VPLMN to which the UE can access, the UE can know of which HPLMN the VPLMN has the S-NSSAI.

If available, the configured NSSAI(s) shall be stored in a non-volatile memory in the UE. The allowed NSSAI(s) should be stored in a non-volatile memory in the UE.

Each of the configured NSSAI stored in the UE is a set composed of at most 16 S-NSSAIs. Each of the allowed NSSAI stored in the UE is a set composed of at most 8 S-NSSAIs and is associated with a PLMN ID or SNPN ID and an access type. Each of the configured NSSAI except the default configured NSSAI, and the rejected NSSAI is associated with a PLMN ID or SNPN ID. The S-NSSAI(s) in the rejected NSSAI for the current registration area are further associated with a registration area where the rejected S-NSSAI(s) is not available. The S-NSSAI(s) in the rejected NSSAI for the current PLMN or SNPN shall be considered rejected for the current PLMN or SNPN regardless of the access type. The S-NSSAI(s) in the rejected NSSAI for the failed or revoked NSSAA shall be considered rejected for the current PLMN regardless of the access type. There shall be no duplicated PLMN IDs or SNPN IDs in each of the list of configured NSSAI(s), allowed NSSAI(s), rejected NSSAI(s) for the current PLMN or SNPN, and rejected NSSAI(s) for the current registration area.

The UE stores NSSAIs as follows.
 a) The configured NSSAI shall be stored until a new configured NSSAI is received for a given PLMN or SNPN. The network may provide to the UE the mapped S-NSSAI(s) for the new configured NSSAI which shall also be stored in the UE. When the UE is provisioned with a new configured NSSAI for a PLMN or SNPN, the UE shall perform the followings.
 1) replace any stored configured NSSAI for this PLMN or SNPN with the new configured NSSAI for this PLMN or SNPN;
 2) delete any stored mapped S-NSSAI(s) for the configured NSSAI and, if available, store the mapped S-NSSAI(s) for the new configured NSSAI;
 3) delete any stored allowed NSSAI for this PLMN or SNPN and, if available, the stored mapped S-NSSAI(s) for the allowed NSSAI, if the UE received the new configured NSSAI for this PLMN or SNPN and the Configuration update indication IE with the Registration requested bit set to "registration requested", in the same CONFIGURATION UPDATE COMMAND message but without any new allowed NSSAI for this PLMN or SNPN included; and 4) delete any stored rejected NSSAI for the current PLMN or SNPN, rejected NSSAI for the current registration area and rejected NSSAI for the failed or revoked NSSAA.

If the UE receives an S-NSSAI associated with a PLMN ID from the network during the PDN connection establishment procedure in EPS, the UE may store the received S-NSSAI in the configured NSSAI for the PLMN identified by the PLMN ID associated with the S-NSSAI (if not already in the configured NSSAI).

The UE may continue storing a received configured NSSAI for a PLMN and associated mapped S-NSSAI(s), if available, when the UE registers in another PLMN.

- b) The allowed NSSAI shall be stored until a new allowed NSSAI is received for a given PLMN or SNPN. The network may provide to the UE the mapped S-NSSAI (s) for the new allowed NSSAI which shall also be stored in the UE. When a new allowed NSSAI for a PLMN or SNPN is received, the UE shall perform the followings.
  1) replace any stored allowed NSSAI for this PLMN or SNPN with the new allowed NSSAI for this PLMN or SNPN;
  2) delete any stored mapped S-NSSAI(s) for the allowed NSSAI and, if available, store the mapped S-NSSAI(s) for the new allowed NSSAI;
  3) remove from the stored rejected NSSAI, the S-NSSAI(s), if any, included in the new allowed NSSAI for the current PLMN or SNPN; and
  4) remove from the stored pending NSSAI, one or more S-NSSAIs, if any, included in the new allowed NSSAI for the current PLMN or SNPN.

If the UE receives the CONFIGURATION UPDATE COMMAND message with the Registration requested bit of the Configuration update indication IE set to "registration requested" and contains no other parameters, the UE shall delete any stored allowed NSSAI for this PLMN or SNPN, and delete any stored mapped S-NSSAI(s) for the allowed NSSAI, if available.

- c) When the UE receives the S-NSSAI(s) included in rejected NSSAI in the REGISTRATION ACCEPT message, the REGISTRATION REJECT message, the DEREGISTRATION REQUEST message or in the CONFIGURATION UPDATE COMMAND message, the UE shall perform the followings.
  1) store the S-NSSAI(s) into the rejected NSSAI based on the associated rejection cause(s);
  2) remove from the stored allowed NSSAI for the current PLMN or SNPN, the S-NSSAI(s), if any, included in the:
    i) rejected NSSAI for the current PLMN or SNPN, for each and every access type;
    ii) rejected NSSAI for the current registration area, associated with the same access type; and
    iii) rejected NSSAI due to the failed or revoked NSSAA, for each and every access type;
  3) remove from the stored pending NSSAI for the current PLMN or SNPN, one or more S-NSSAIs, if any, included in the:
    i) rejected NSSAI for the current PLMN or SNPN, for each and every access type;
    ii) rejected NSSAI for the current registration area, associated with the same access type; and
    iii) rejected NSSAI for the failed or revoked NSSAA, for each and every access type.

When the UE:
1) deregisters with the current PLMN using explicit signalling or enters state 5GMM-DEREGISTERED for the current PLMN; or
2) successfully registers with anew PLMN; or
3) enters state 5GMM-DEREGISTERED following an unsuccessful registration with a new PLMN;

and the UE is not registered with the current PLMN over another access, the rejected NSSAI for the current PLMN shall be deleted.

When the UE:
1) deregisters over an access type;
2) successfully registers in a new registration area over an access type; or
3) enters state 5GMM-DEREGISTERED or 5GMM-REGISTERED following an unsuccessful registration in a new registration area over an access type;

the rejected NSSAI for the current registration area corresponding to the access type shall be deleted.

- d) When the UE receives one or more S-NSSAIs included in pending NSSAI in the REGISTRATION ACCEPT message, the UE shall store one or more S-NSSAIs for the pending NSSAI.

When the UE:
1) deregisters with the current PLMN using explicit signalling or enters state 5GMM-DEREGISTERED for the current PLMN;
2) successfully registers with anew PLMN;
3) enters state 5GMM-DEREGISTERED following an unsuccessful registration with a new PLMN;
4) successfully completes an attach or tracking area update procedure in S1 mode; or
5) initiates attach or tracking area update procedure in S1 mode and receives an ATTACH REJECT or TRACKING AREA UPDATE REJECT;

and the UE is not registered with the current PLMN over another access, the pending NSSAI for the current PLMN shall be deleted.

- e) In case of a PLMN, when the UE receives the Network slicing indication IE with the Network slicing subscription change indication set to "Network slicing subscription changed" in the REGISTRATION ACCEPT message or in the CONFIGURATION UPDATE COMMAND message, the UE shall delete the network slicing information for each of the PLMNs that the UE has slicing information stored for (excluding the current PLMN). The UE shall not delete the default configured NSSAI. Additionally, the UE shall update the network slicing information for the current PLMN (if received) as specified above in bullets a), b), c) and e).

Initial registration not accepted by the network is described. Section 5.5.1.2.5 of 3GPP TS 24.501 V16.4.1 can be referred.

When the network slice requested by the UE is not available, the network informs that a specific network slice is unavailable through a rejected NSSAI. When the network informs that a specific slice is unavailable, the UE performs the registration procedure again in the current cell if a network slice other than the specific network slice is available, and selects another PLMN if all network slices are unavailable.

More specifically, if the initial registration request cannot be accepted by the network, the AMF shall send a REGISTRATION REJECT message to the UE including an appropriate 5GMM cause value.

If the initial registration request is rejected for the following reason, the network shall set the 5GMM cause value to #62 "No network slices available" and may include the rejected NSSAI.
a) all the S-NSSAI(s) included in the requested NSSAI are either rejected for the current PLMN, rejected for the current registration area, or rejected due to the failed or revoked NSSAA, or the UE did not request any S-NSSAIs; and
b-1) the UE set the NSSAA bit in the 5GMM capability information element (IE) to "Network slice-specific authentication and authorization supported" and there are no subscribed S-NSSAIs marked as default; or
b-2) the UE set the NSSAA bit in the 5GMM capability information element (IE) to "Network slice-specific authentication and authorization not supported", and i) there are no subscribed S-NSSAIs which are marked as default, ii) all subscribed S-NSSAIs marked as default are subject to NSSAA;

The UE performs the following operation according to the 5GMM cause value set to #62.

The UE shall abort the initial registration procedure, set the 5GS update status to "5U2 NOT UPDATED" and enter state "5GMM-DEREGISTERED.NORMAL-SERVICE" or "5GMM-DEREGISTERED.PLMN-SEARCH". Additionally, the UE shall reset the registration attempt counter.

The UE receiving the rejected NSSAI in the REGISTRATION REJECT message takes the following actions based on the rejection cause in the rejected S-NSSAI(s).

"S-NSSAI not available in the current PLMN or SNPN": The UE shall store the rejected S-NSSAI(s) in the rejected NSSAI for the current PLMN or SNPN and not attempt to use this S-NSSAI(s) in the current PLMN or SNPN until switching off the UE, the universal integrated circuit card (UICC) containing the universal subscriber identification module (USIM) is removed, an entry of the "list of subscriber data" with the SNPN identity of the current SNPN is updated, or the rejected S-NSSAI(s) are removed.

"S-NSSAI not available in the current registration area": The UE shall store the rejected S-NSSAI(s) in the rejected NSSAI for the current registration area and not attempt to use this S-NSSAI(s) in the current registration area until switching off the UE, the UE leaves the current registration area, the UICC containing the USIM is removed, an entry of the "list of subscriber data" with the SNPN identity of the current SNPN is updated, or the rejected S-NSSAI(s) are removed.

"S-NSSAI not available due to the failed or revoked network slice-specific authentication and authorization": The UE shall store the rejected S-NSSAI(s) in the rejected NSSAI due to the failed or revoked NSSAA and not attempt to use this S-NSSAI(s) in the current PLMN through all accesses until switching off the UE, the UICC containing the USIM is removed, an entry of the "list of subscriber data" with the SNPN identity of the current SNPN is updated, or the rejected S-NSSAI(s) are removed.

If the UE has an allowed NSSAI or configured NSSAI that contains S-NSSAI(s) which are not included any of the rejected NSSAI for the current PLMN or SNPN, the rejected NSSAI for the current registration area, and the rejected NSSAI due to the failed or revoked NSSAA, the UE may stay in the current serving cell, and apply the normal cell reselection process. In addition, the UE may start an initial registration with a requested NSSAI that includes any S-NSSAI from the allowed NSSAI or the configured NSSAI that is neither in the rejected NSSAI for the PLMN or SNPN nor in the rejected NSSAI for the current registration area. Otherwise, the UE may perform a PLMN selection or SNPN selection.

NSSAA is described. Section 4.2.9 of 3GPP TS 23.502 V16.4.0 can be referred.

The NSSAA procedure is triggered for an S-NSSAI requiring Network Slice-Specific Authentication and Authorization with an AAA server (AAA-S) which may be hosted by the H-PLMN operator or by a third party which has a business relationship with the H-PLMN, using the EAP framework. An AAA proxy (AAA-P) in the HPLMN may be involved, e.g., if the AAA Server belongs to a third party.

This procedure is triggered by the AMF during a Registration procedure (e.g., Step 25 of FIG. 7) when some Network Slices require Slice-Specific Authentication and Authorization, when AMF determines that Network Slice-Specific Authentication and Authorization is required for an S-NSSAI in the current Allowed NSSAI (e.g., subscription change), or when the AAA server that authenticated the Network Slice triggers a re-authentication.

The AMF performs the role of the EAP authenticator and communicates with the AAA-S via the AUSF. The AUSF undertakes any AAA protocol interworking with the AAA protocol supported by the AAA-S.

Figure 8:
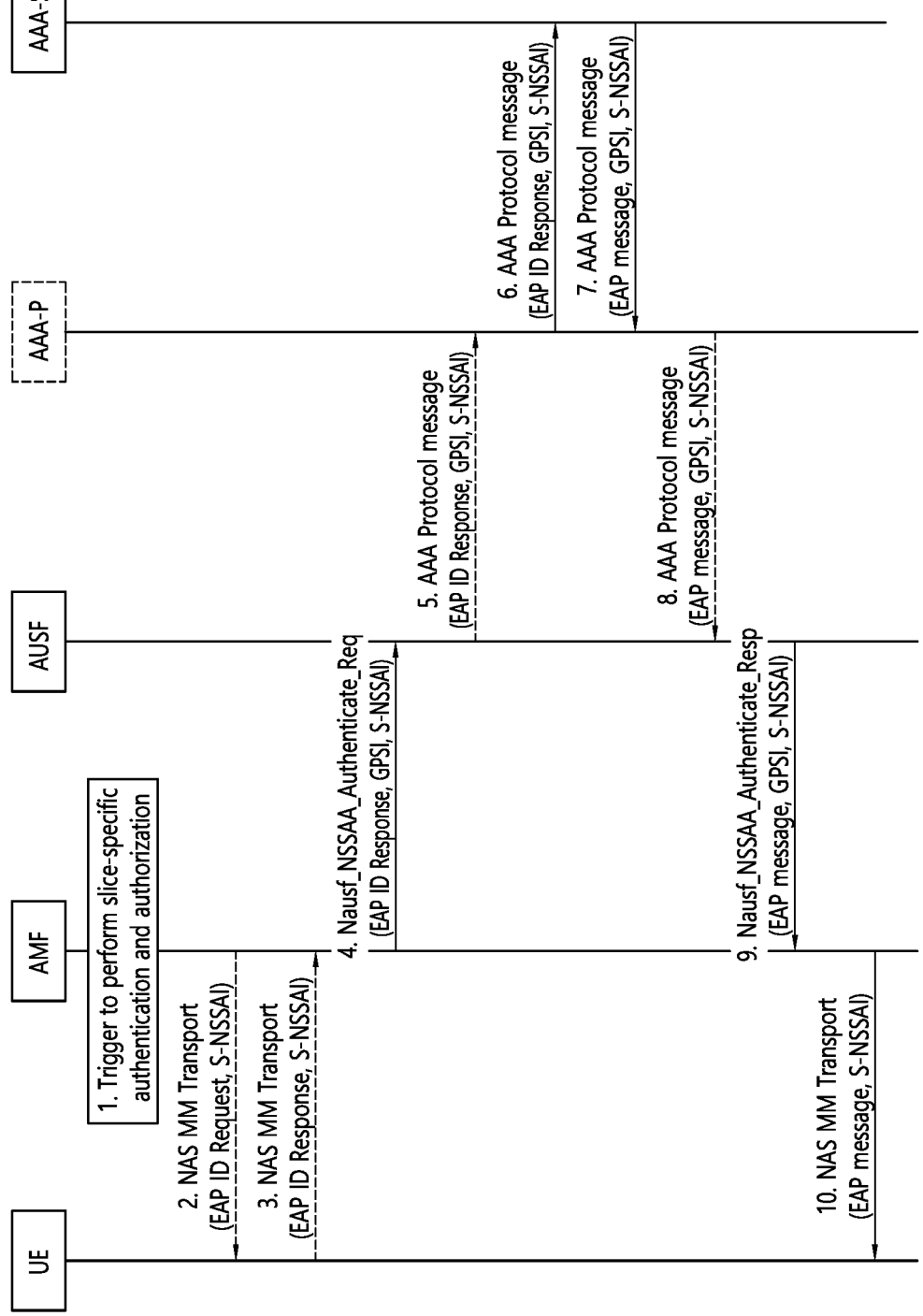
FIGS. 8 and 9 show an example of an NSSAA procedure to which implementation of the present disclosure are applied.
Figure 9:
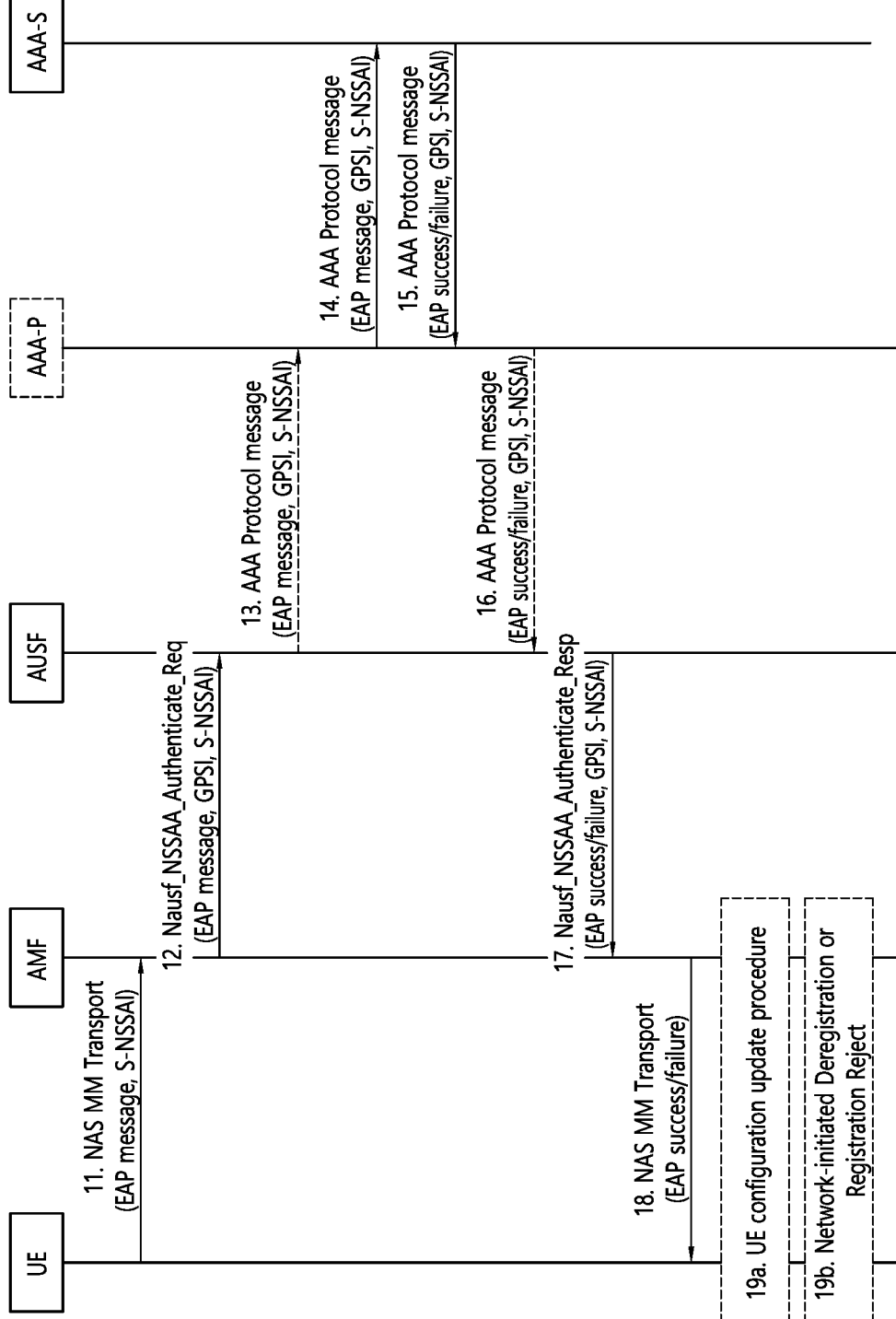

FIGS. 8 and 9 show an example of an NSSAA procedure to which implementations of the present disclosure are applied.

The AMF determines whether to perform the NSSAA procedure, and when the AMF determines to perform the NSSAA procedure, the AMF delivers an EAP ID request to the UE. When the AMF receives the EAP ID response from the UE, the AMF delivers it to the AAA-S through NSSAA Function (NSSAAF). After exchanging multiple EAP requests/responses, EAP success or failure is delivered. At this time, the AMF stores the EAP result of the corresponding S-NSSAI, and delivers the Allowed NSSAI or the Rejected NSSAI to the UE through the UE configuration update procedure.

First, the procedure of FIG. 8 is described.
1. For S-NSSAIs that are requiring NSSAA, based on change of subscription information, or triggered by the AAA-S, the AMF may trigger the start of the NSSAA procedure.

If NSSAA procedure is triggered as a result of registration procedure, the AMF may determine, based on UE context in the AMF, that for some or all S-NSSAI(s) subject to NSSAA, the UE has already been authenticated following a registration procedure on a first access. Depending on NSSAA result (e.g., success/failure) from the previous registration, the AMF may decide, based on network policies, to skip NSSAA for these S-NSSAIs during the registration on a second access.

If the NSSAA procedure corresponds to a re-authentication and re-authorization procedure triggered as a result of AAA-S-triggered UE re-authentication and re-authorization for one or more S-NSSAIs, or triggered by the AMF based on operator policy or a subscription change and if S-NSSAIs that are requiring NSSAA are included in the Allowed NSSAI for each access type, the AMF selects an access type to be used to perform the NSSAA procedure based on network policies.

The AMF may send an EAP ID request for the S-NSSAI in a NAS MM transport message including the S-NSSAI. This is the S-NSSAI of the H-PLMN, not the locally mapped S-NSSAI value.

The UE provides the EAP ID response for the S-NSSAI alongside the S-NSSAI in an NAS MM transport message towards the AMF.

The AMF sends the EAP ID Response to the AUSF in a Nausf_NSSAA_Authenticate Request (EAP ID response, AAA-S address, Generic Public Subscription Identifier (GPSI), S-NSSAI).

If the AAA-P is present (e.g., because the AAA-S belongs to a third party and the operator deploys a proxy towards third parties), the AUSF forwards the EAP ID response message to the AAA-P. Otherwise, the AUSF forwards the message directly to the AAA-S. The AUSF uses towards the AAA-P or the AAA-S an AAA protocol message of the same protocol supported by the AAA-S.

6. The AAA-P forwards the EAP ID message to the AAA-S addressable by the AAA-S address together with S-NSSAI and GPSI. The AAA-S stores the GPSI to create an association with the EAP ID in the EAP ID response message, so the AAA-S can later use it to revoke authorization or to trigger reauthentication.

7-14. EAP-messages are exchanged with the UE. One or more than one iteration of these steps may occur.

Now, the procedure of FIG. 9 following the procedure of FIG. 8 will be described.

15. EAP authentication completes. The AAA-S stores the S-NSSAI for which the authorization has been granted, so it may decide to trigger reauthentication and reauthorization based on its local policies. An EAP-Success/Failure message is delivered to the AAA-P (or if the AAA-P is not present, directly to the AUSF) with GPSI and S-NSSAI.

16. If the AAA-P is used, the AAA-P sends an AAA Protocol message including EAP-Success/Failure, S-NSSAI, GPSI to the AUSF.

17. The AUSF sends the ausf_NSSAA_Authenticate Response including EAP-Success/Failure, S-NSSAI, GPSI to the AMF.

18. The AMF transmits a NAS MM transport message (EAP-Success/Failure) to the UE. The AMF shall store the EAP result for each S-NSSAI for which the NSSAA procedure in steps 1-17 was executed.

19a. [Conditional] If a new Allowed NSSAI (i.e., including any new S-NSSAIs in a Requested NSSAI for which the NSSAA procedure succeeded and/or excluding any S-NSSAI(s) in the existing Allowed NSSAI for the UE for which the procedure has failed) and/or new Rejected S-NSSAIs (i.e., including any S-NSSAI(s) in the existing Allowed NSSAI for the UE for which the procedure has failed, or any new requested S-NSSAI(s) for which the NSSAA procedure failed) need to be delivered to the UE, or if the AMF re-allocation is required, the AMF initiates the UE Configuration Update procedure, for each access type.

19b. [Conditional] If the NSSAA procedure fails for all S-NSSAIs (if any) in the existing Allowed NSSAI for the UE and (if any) for all S-NSSAIs in the Requested NSSAI, the AMF shall execute the network-initiated deregistration procedure, or reject the UE registration request (if that was the trigger for this procedure). The AMF shall include in the explicit de-registration request or registration reject message the list of Rejected S-NSSAIs, each of them with the appropriate rejection cause value. If the network slice-specific re-authentication and re-authorization fails and there are PDU session(s) established that are associated with the S-NSSAI for which the NSSAA procedure failed, the AMF shall initiate the PDU session release procedure to release the PDU sessions with the appropriate cause value.

Figure 10:
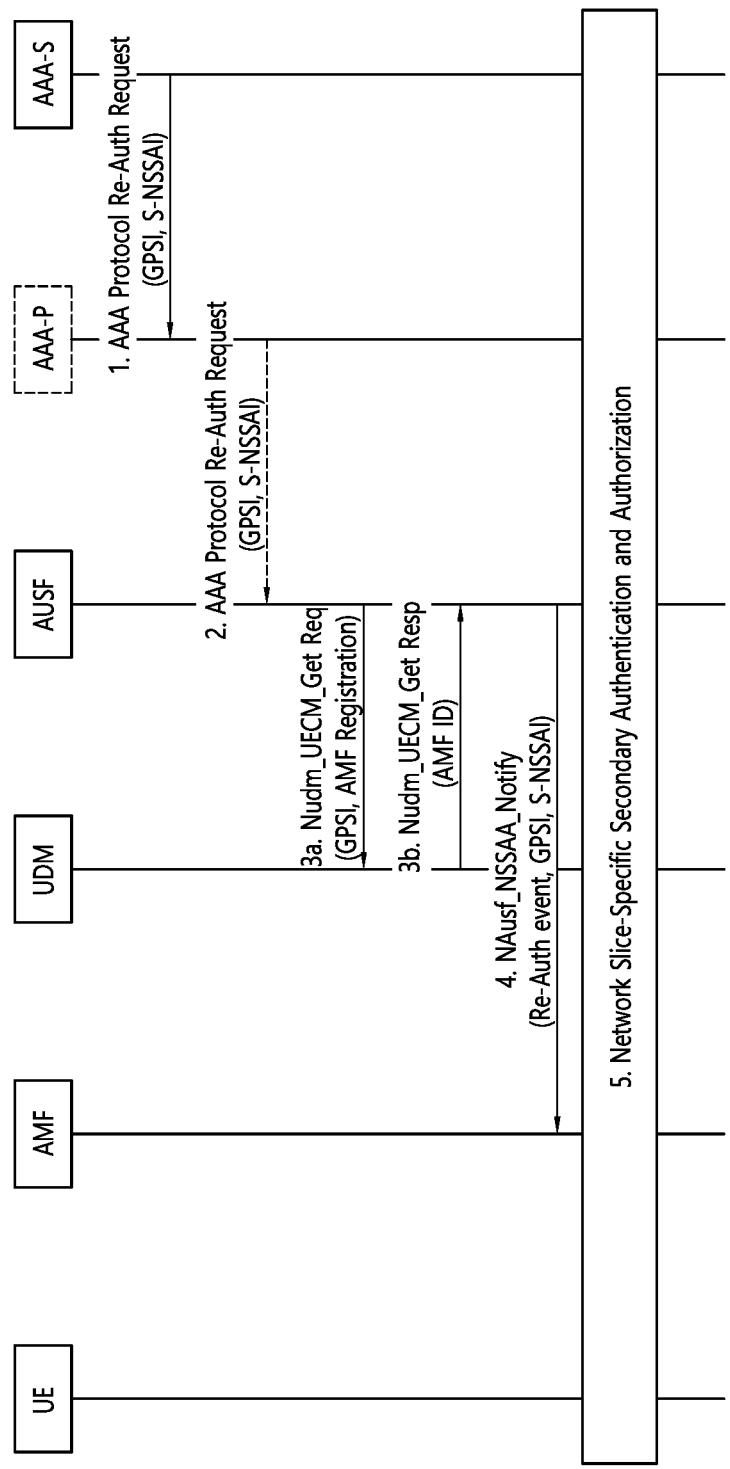
FIG. 10 shows an example of a network slice specific re-authentication and re-authorization procedure initiated by AAA-S to which implementations of the present disclosure are applied.

FIG. 10 shows an example of a network slice specific re-authentication and re-authorization procedure initiated by AAA-S to which implementations of the present disclosure are applied.

The AAA-S triggers re-authentication and re-authorization of NSSAA. Re-authentication and re-authorization are performed for network slices that have already been authenticated and authorized. When AAA-S informs the reauthentication event, GPSI, and S-NSSAI, the AMF performs NSSAA re-authentication and re-authorization.

1. The AAA-S requests the re-authentication and re-authorization for the network slice specified by the S-NSSAI in the AAA protocol re-authentication request message, for the UE identified by the GPSI in this message. This message is sent to a AAA-P, if the AAA-P is used (e.g., the AAA Server belongs to a third party), otherwise it is sent directly to the AUSF.
2. The AAA-P, if present, relays the request to the AUSF.
3a-3b. The AUSF gets AMF ID from UDM using Nudm_UECM_Get with the GPSI in the received AAA message.
4. The AUSF notifies re-authentication event to the AMF to re-authenticate/re-authorize the S-NSSAI for the UE using Nausf_NSSAA_Notify with the GPSI and S-NSSAI in the received AAA message.
5. The AMF triggers the NSSAA procedure defined in FIGS. 8 and 9.

Figure 11:
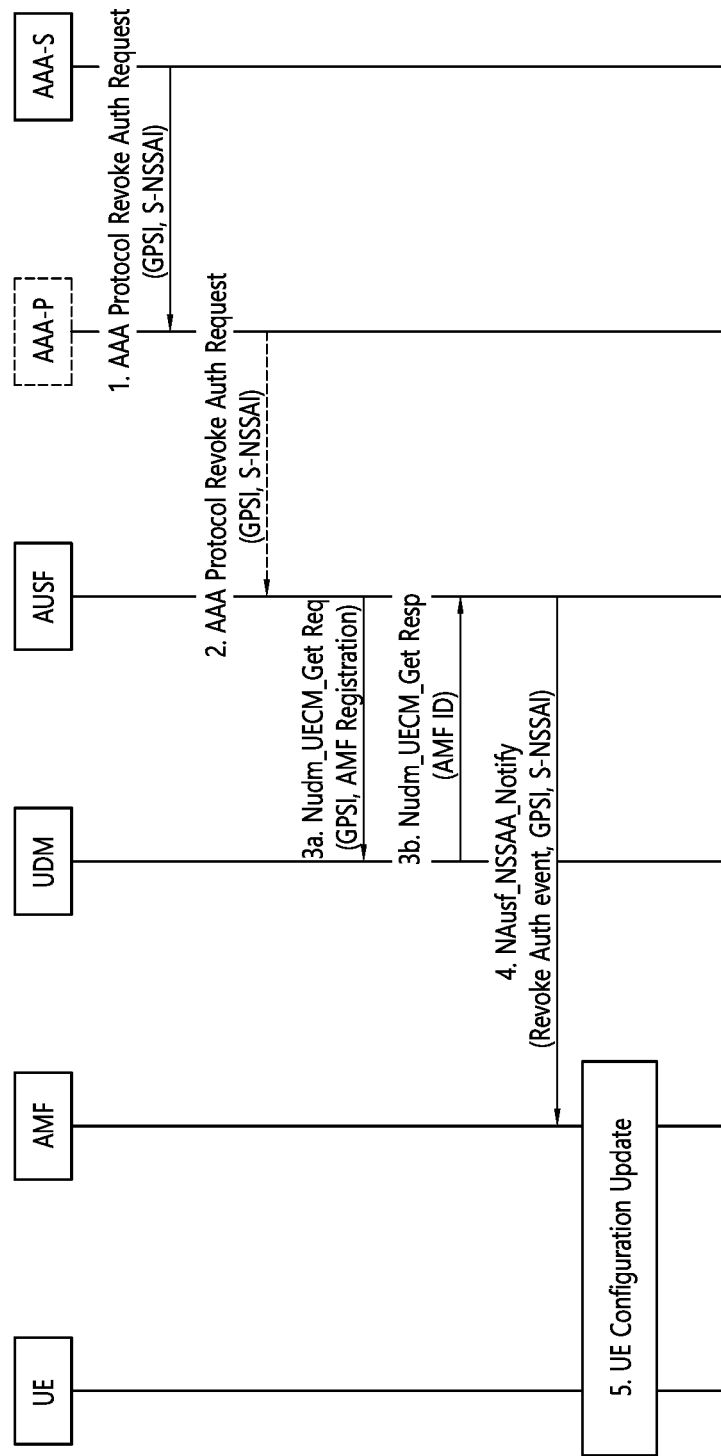
FIG. 11 shows an example of a network slice specific authorization revocation procedure initiated by AAA-S to which implementations of the present disclosure are applied.

FIG. 11 shows an example of a network slice specific authorization revocation procedure initiated by AAA-S to which implementations of the present disclosure are applied.

The AAA-S may cancel and/or revoke authentication and/or authorization for S-NSSAI for which authentication and authorization procedures have already been performed, when desired.

1. The AAA-S requests the revocation of authorization for the network slice specified by the S-NSSAI in the AAA protocol revoke authorization Request message, for the UE identified by the GPSI in this message. This message is sent to AAA-P if it is used.
2. The AAA-P, if present, relays the request to the AUSF.
3a-3b. AUSF gets AMF ID from UDM using Nudm_UECM_Get with the GPSI in the received AAA message.
4. The AUSF notifies revoke authorization event to the AMF to revoke the S-NSSAI authorization for the UE using Nausf_NSSAA_Notify with the GPSI and S-NSSAI in the received AAA message.
5. The AMF updates the UE configuration to revoke the S-NSSAI from the current Allowed NSSAI, for any access type for which NSSAA had been successfully run on this S-NSSAI. The UE configuration update may include a request to register if the AMF needs to be re-allocated. The AMF provides a new Allowed NSSAI to the UE by removing the S-NSSAI for which authorization has been revoked. The AMF provides new rejected NSSAIs to the UE including the S-NSSAI for which authorization has been revoked. If no S-NSSAI is left in Allowed NSSAI for an access after the revocation, and a default NSSAI exists that requires no network slice specific authentication or for which a network slice specific authentication did not previously fail over this access, then the AMF may provide a new Allowed NSSAI to the UE containing the default NSSAI. If no S-NSSAI is left in Allowed NSSAI for an access after the revocation, and no default NSSAI can be provided to the UE in the Allowed NSSAI or a previous network slice specific authentication failed for the default NSSAI over this access, then the AMF shall execute the network-initiated deregistration procedure for the access, and it shall include in the explicit de-registration request message the list of Rejected S-NSSAIs, each of them with the appropriate rejection cause value. If there are PDU session(s) established that are associated with the revoked S-NSSAI, the AMF shall initiate the PDU session release procedure to release the PDU sessions with the appropriate cause value.

As described above with reference to FIGS. 8 to 11, the NSSAA procedure is a procedure in which the UE additionally performs authentication and authorization for a specific network slice after success of the initial authentication and authorization procedure with the network. When the UE performs a registration request, the UE informs the network (e.g., AMF) that the UE supports the NSSAA function. The network (e.g., AMF) determines whether to perform the NSSAA procedure for the S-NSSAI requested by the UE to register, and performs the NSSAA procedure accordingly. If the NSSAA procedure fails, the network notifies the UE of the failure of the NSSAA procedure, and also informs the UE of the Rejected NSSAI for the corresponding S-NSSAI through a UE configuration update command message. The S-NSSAI received through the Rejected NSSAI is stored in the memory of the UE as a Rejected NSSAI until the UE is powered off or the USIM is removed. In addition, the use of the S-NSSAI is prohibited to prevent data transmission using the S-NSSAI to the PLMN that informed the Rejected NSSAI.

Meanwhile, the AAA-S may trigger the NSSAA procedure for re-authentication and re-authorization for the S-NSSAI for which authentication and authorization have already been successful. However, for the S-NSSAI rejected because the NSSAA procedure has failed, the AMF cannot request authentication through the NSSAA procedure.

As a result, for the S-NSSAI included in the Rejected NSSAI because the NSSAA procedure has failed due to a network error or timeout, etc., the network does not perform the NSSAA procedure because the UE does not request it, and since the network can also perform re-authentication only for network slices that have already been authenticated and authorized, a network slice rejected due to NSSAA failure cannot be the target of a re-authentication request. Therefore, until the UE is powered off or the USIM is removed, data transmission using the network slice in which the NSSAA procedure has failed to this PLMN is prohibited.

Meanwhile, in the 5G system, various types of devices such as a telematics device driven in a vehicle other than traditional smartphones may be UEs. For example, a telematics device driven in a vehicle may use an embedded SIM (eSIM) or an embedded universal integrated circuit card (eUICC), which is a semiconductor device, rather than a traditional MFF2 type removable USIM card due to its characteristics. Since these eSIMs or eUICCs are semiconductor devices, they cannot be removed. In addition, since the telematics device is a communication module provided by the vehicle, and its general purpose is to operate a vehicle application in preparation for theft or vehicle overturn in a parked vehicle, typical power inputs for the telematics device are the vehicle's own battery and/or an additional auxiliary battery. Therefore, it is difficult to turn off the power of the telematics device unless the vehicle is completely discharged. Also, even if the vehicle is completely discharged, since the power of the telematics device can be supplied through an additional auxiliary battery, the power of the telematics device is more difficult to turn off.

In summary, a UE such as a telematics device that is difficult to power off or remove the USIM may operate in the 5G system. For such a UE, there is a possibility that data transmission through the S-NSSAI where the NSSAA failure occurred is forever impossible in the corresponding PLMN. That is, even though the NSSAA procedure is highly likely to succeed after a certain period of time when NSSAA failure occurs due to a temporary network error or time lapse, if NSSAA failure occurs once for a specific S-NSSAI, the data transmission using the corresponding S-NSSAI is prohibited until the power of the UE is turned off or the USIM is removed, and the UE cannot use the corresponding S-NSSAI because it is difficult to power off or remove the USIM. As a result, for a UE that is difficult to power off or remove the USIM, an error handling method that allows the NSSAA procedure to be performed again only after the power is turned off or the USIM is removed when an error occurs in the same way as a normal UE may be quite dangerous.

In addition, the purpose of the NSSAA procedure is the granting of network slice specific authentication authorization. The AAA-S may perform authentication authorization for each in-vehicle network slice, and such authentication authorization may be performed based on network policies or network configuration options. For example, authentication of a network slice for GM V2X communication may be performed once a week. Or, for example, authentication of a network slice for GM V2X communication may be performed whenever a network slice related application for GM V2X communication of a corresponding UE is executed. In this case, if NSSAA for the corresponding network slice fails once, the corresponding network slice cannot be used until the next week or until the next application is executed.

Therefore, if the NSSAA procedure fails for a UE whose error recovery cannot be performed by self-initialization because it is difficult to power off or remove the USIM, and/or the NSSAA procedure fails due to a network error, a method of performing the NSSAA procedure again for a network slice for which the NSSAA procedure fails may be required.

According to implementations of the present disclosure, when a UE requesting registration is a device that has difficulty entering a power cycle, such as a telematics device using an eSIM, etc., even if the NSSAA procedure fails for a specific S-NSSAI and the UE receives a rejected NSSAI including the specific S-NSSAI from the AMF, the UE may transmit data later in the same PLMN using the specific S-NSSAI.

According to implementations of the present disclosure, when the UE capable of performing the NSSAA re-authentication procedure informs the network of the capability of performing the NSSAA re-authentication procedure, the network (e.g., AMF) may transmit the rejected NSSAI along with time information to the UE when the NSSAA fails according to the UE's capability to perform the NSSAA re-authentication procedure and the cause of the NSSAA failure. Through this, upon receiving the rejected NSSAI together with the time information, the UE may transmit data later in the same PLMN through the S-NSSAI included in the rejected NSSAI and requesting data transmission.

According to implementations of the present disclosure, when requesting network registration/access, the UE may inform the network of the fact that the UE having difficulty entering a power cycle requests network registration/access.

In addition, the UE may inform the network that the corresponding UE is a UE capable of performing the NSSAA re-authentication procedure.

According to implementations of the present disclosure, then, the network (e.g., AMF) may recognize UEs that have difficulty entering the power cycle and those that do not, and if it is determined that recovery is difficult by turning the power off and then on in the UE when the NSSAA procedure fails (i.e., in the case of a UE that has difficulty entering the power cycle), the NSSAA re-authentication procedure may be requested again for the UE. In this case, the network may deliver the rejected NSSAI and time information together to the UE having difficulty entering the power cycle, and may deliver only the rejected NSSAI to the other UE. That is, the network may propose different rejected NSSAI processing methods according to UE characteristics.

According to implementations of the present disclosure, when the network delivers the rejected NSSAI and time information to the UE having difficulty entering the power cycle, the network may configure the UE to transmit data even after a specific time.

According to implementations of the present disclosure, a method of operating the UE and a method of requesting network registration/access by the UE may be proposed so that the UE receiving the rejected NSSAI due to NSSAA failure attempts data transmission with respect to the corresponding network slice. Upon receiving the rejected NSSAI and time information, the UE may delete the S-NSSAI for which NSSAA has failed from the rejected NSSAI after the corresponding time has elapsed.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
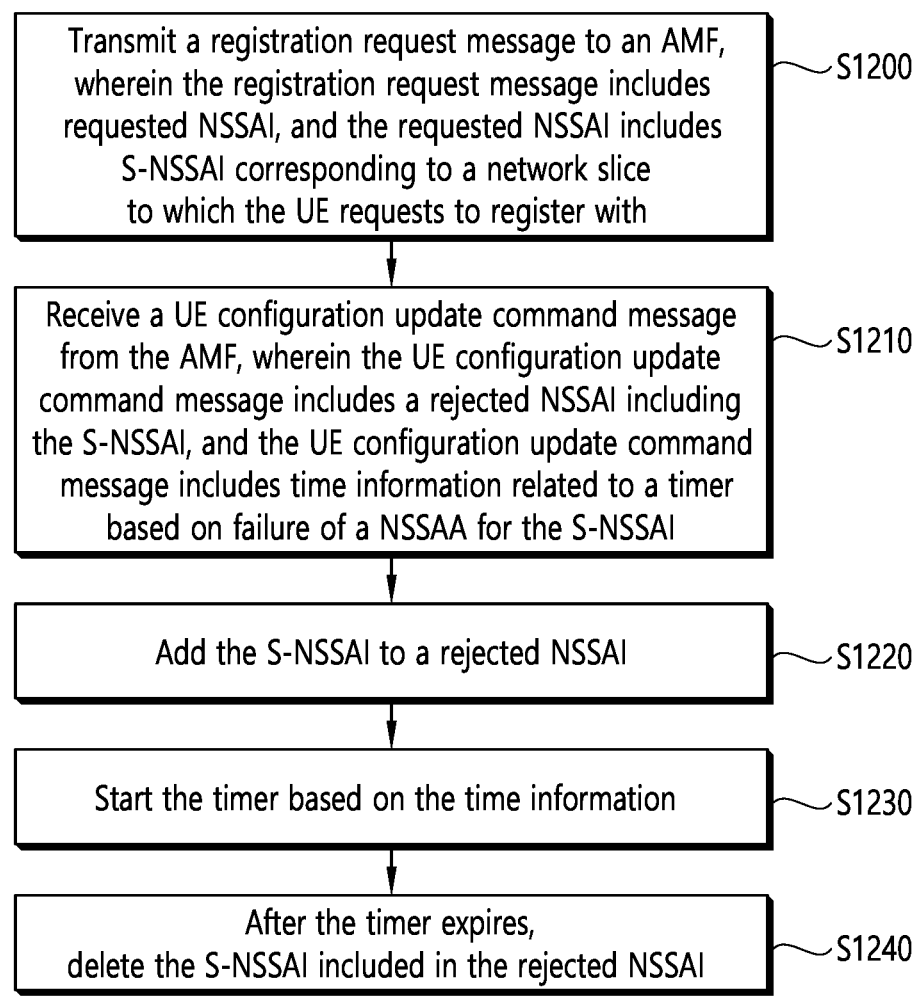
FIG. 12 shows an example of a method performed by a UE to which implementations of the present disclosure are applied.

FIG. 12 shows an example of a method performed by a UE to which implementations of the present disclosure are applied.

In step S1200, the method comprises transmitting a registration request message to an AMF. The registration request message includes requested NSSAI. The requested NSSAI includes S-NSSAI corresponding to a network slice to which the UE requests to register with.

In some implementations, information informing that the UE is a specific type of device may be transmitted to the AMF. The specific type of device may include at least one of a device capable of performing an NSSAA re-authentication procedure and/or a device having difficulty entering a power cycle.

In step S1210, the method comprises receiving a UE configuration update command message from the AMF. The UE configuration update command message includes a rejected NSSAI including the S-NSSAI. The UE configuration update command message includes time information related to a timer based on failure of a NSSAA for the S-NSSAI.

In some implementations, the failure of the NSSAA for the first S-NSSAI may be a failure due to a problem of a network. The failure due to the problem of the network may correspond to a hypertext transfer protocol (HTTP) status code, delivered from an NSSAAF, being "504 gateway timeout" and/or "5xx".

In some implementations, the time information may be transmitted from an AAA-S to the AMF via an NSSAAF for periodic NSSAA performance. Or, in some implementations, the time information may be stored in the AMF or a UDM as a usable network slice characteristic for the failure of the NSSAA for the S-NSSAI.

In step S1220, the method comprises adding the S-NSSAI to a rejected NSSAI.

In step S1230, the method comprises starting the timer based on the time information.

In step S1240, the method comprises, after the timer expires, deleting the S-NSSAI included in the rejected NSSAI.

In some implementations, after the timer expires, a second registration request message including a requested NSSAI including the S-NSSAI may be transmitted to the AMF. Based on success of the NSSAA for the first S-NSSAI, an allowed NSSAI including the first S-NSSAI may be received from the AMF.

In some implementations, the UE may be in communication with at least one of a mobile device, a network, and/or autonomous vehicles other than the UE.

Furthermore, the method in perspective of the UE described above in FIG. 12 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions that, based on being executed by the at least one processor, perform operations below.

The UE transmits a registration request message to an AMF. The registration request message includes requested NSSAI. The requested NSSAI includes S-NSSAI corresponding to a network slice to which the UE requests to register with.

In some implementations, information informing that the UE is a specific type of device may be transmitted to the AMF. The specific type of device may include at least one of a device capable of performing an NSSAA re-authentication procedure and/or a device having difficulty entering a power cycle.

The UE receives a UE configuration update command message from the AMF. The UE configuration update command message includes a rejected NSSAI including the S-NSSAI. The UE configuration update command message includes time information related to a timer based on failure of a NSSAA for the S-NSSAI.

In some implementations, the failure of the NSSAA for the first S-NSSAI may be a failure due to a problem of a network. The failure due to the problem of the network may correspond to a hypertext transfer protocol (HTTP) status code, delivered from an NSSAAF, being "504 gateway timeout" and/or "5xx".

In some implementations, the time information may be transmitted from an AAA-S to the AMF via an NSSAAF for periodic NSSAA performance. Or, in some implementations, the time information may be stored in the AMF or a UDM as a usable network slice characteristic for the failure of the NSSAA for the S-NSSAI.

The UE adds the S-NSSAI to a rejected NSSAI.

The UE starts the timer based on the time information.

The UE, after the timer expires, deletes the S-NSSAI included in the rejected NSSAI.

In some implementations, after the timer expires, a second registration request message including a requested NSSAI including the S-NSSAI may be transmitted to the AMF.

Based on success of the NSSAA for the first S-NSSAI, an allowed NSSAI including the first S-NSSAI may be received from the AMF.

Furthermore, the method in perspective of the UE described above in FIG. 12 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: generating a registration request message, wherein the registration request message includes requested NSSAI, and wherein the requested NSSAI includes S-NSSAI corresponding to a network slice to which the UE requests to register with; obtaining a UE configuration update command message, wherein the UE configuration update command message includes a rejected NSSAI including the S-NSSAI, and wherein the UE configuration update command message includes time information related to a timer based on failure of a NSSAA for the S-NSSAI; adding the S-NSSAI to a rejected NSSAI; starting the timer based on the time information; and after the timer expires, deleting the S-NSSAI included in the rejected NSSAI.

Furthermore, the method in perspective of the UE described above in FIG. 12 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions that, based on being executed by at least one processor, perform operations comprising: generating a registration request message, wherein the registration request message includes requested NSSAI, and wherein the requested NSSAI includes S-NSSAI corresponding to a network slice to which the UE requests to register with; obtaining information informing that a NSSAA for the S-NSSAI has failed based on a HTTP status code "5xx", wherein the HTTP status code "5xx" informs at least one of a network problem or no response within a certain time; and delivering, to an upper layer of the UE, the information informing that the NSSAA for the S-NSSAI has failed.

Figure 13:
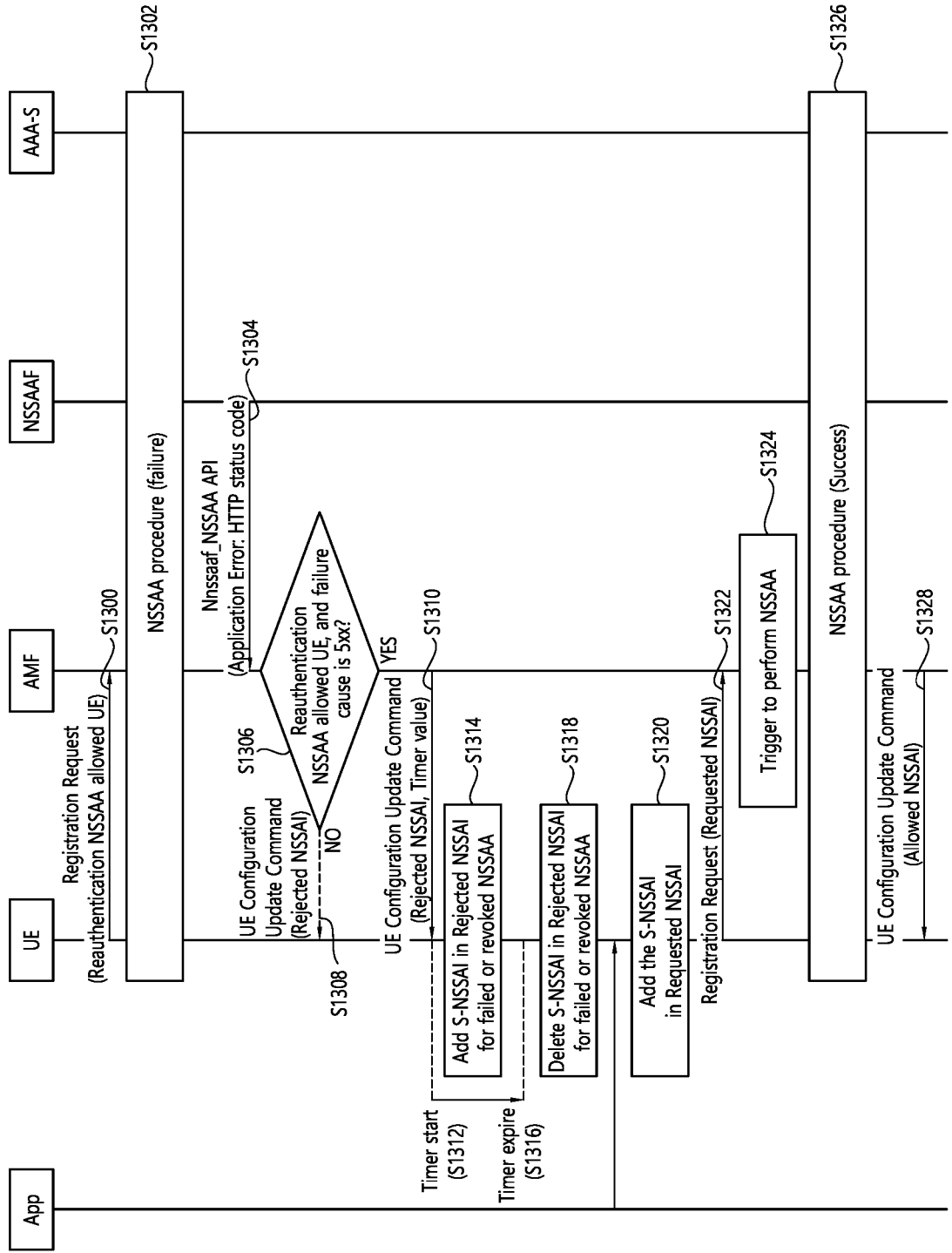
FIG. 13 shows another example of a method performed by a UE to which implementations of the present disclosure is applied.

FIG. 13 shows another example of a method performed by a UE to which implementations of the present disclosure is applied.

In step S1300, the UE transmits a registration request message to the AMF. The registration request message contains the requested NSSAI including the specific S-NSSAI. In addition, if the UE is a type of device that is difficult to power off or remove the USIM, the UE informs the network that it is a UE capable of performing the NSSAA re-authentication procedure, which is a new capability of the UE, in order to request the NSSAA re-authentication procedure from the network.

In step S1302, the NSSAA procedure fails for the specific S-NSSAI.

In step S1304, the NSSAAF transmits the HTTP status code as the NSSAA failure cause to the AMF.

In step S1306, the AMF determines whether the UE is capable of performing the NSSAA re-authentication procedure and/or whether the HTTP status code corresponding to the NSSAA failure cause is "504 gateway timeout" or "5xx". If the HTTP status code is "504 gateway timeout" or "5xx", the AMF determines that the NSSAA failure is caused by a temporary network problem rather than an actual authentication failure.

In step S1308, if the UE is a UE that is not capable of performing the NSSAA re-authentication procedure and/or the HTTP status code corresponding to the NSSAA failure cause is 4xx (e.g., "403 forbidden", "404 not found"), the AMF may transmit a UE configuration update command message containing only the rejected NSSAI to the UE.

In step S1308, if the UE is a UE capable of performing the NSSAA re-authentication procedure and the HTTP status code is "504 gateway timeout" or "5xx", the AMF may transmit a UE a UE configuration update command message containing the rejected NSSAI and time information to the UE.

When the UE receives the UE configuration update command message including the rejected NSSAI and time information, in step S1312, the UE starts a timer according to the time information, and in step S1314, the UE includes/stores the S-NSSAI received through the rejected NSSAI in the rejected NSSAI.

In step S1316, when the timer expires, the UE deletes the corresponding S-NSSAI from the rejected NSSAI.

Then, when requesting network registration/access to perform data transmission through the corresponding S-NSSAI, in step S1320, the UE includes the corresponding S-NSSAI in the requested NSSAI. In step S1322, the UE transmits a registration request message including the requested NSSAI to the AMF.

In step S1324, the AMF triggers the NSSAA procedure again. Accordingly, in step S1326, the NSSAA procedure succeeds.

In step S1328, the AMF informs the UE of the allowed NSSAI for the corresponding S-NSSAI. After that, since the S-NSSAI corresponding to the allowed NSSAI succeeds in the registration request, data transmission can be performed through the corresponding S-NSSAI in the network in which the NSSAA failure occurred previously.

1. First Implementation

According to the first implementation of the present disclosure, the UE having difficulty entering the power cycle may notify the fact that it is difficult to enter the power cycle when requesting network registration/access. General IoT devices such as unmanned metering machines, unmanned vending machines, and intelligent transportation services are difficult to turn off or remove the USIM due to the characteristics of devices that can autonomously share information with each other without human intervention. Accordingly, a UE having such an IoT capability may be regarded as having characteristics of a UE having difficulty entering a power cycle, and the IoT UE capability may be replaced with the characteristics of a UE proposed in the present disclosure.

According to the first implementation of the present disclosure, the UE capability that the UE has difficulty entering the power cycle may correspond to the case where the UE has eMTC capability, the UE has NB-IoT capability, or the UE has Category 0 capability. Alternatively, when the UE has 5G control plane (CP) cellular internet-of-things (CIoT) or 5G user plane (UP) CIoT capabilities, it may be difficult for the UE to enter a power cycle. The AS layer of the UE may inform the NAS layer of the UE of a related radio capability that is difficult to enter a power cycle, and the NAS layer of the UE may inform the AMF of the corresponding capability. Alternatively, the gNB or eNB may inform the AMF of the related radio capability that is difficult to enter a power cycle notified by the AS layer of the UE.

According to the first implementation of the present disclosure, the UE may use a 5GMM capability information element (IE) to inform that the UE is difficult to enter the power cycle. For example, an indicator indicating that the UE is difficult to enter the power cycle may be indicated by a new bit in the 5GMM capability IE included in the registration request message. The network may determine that it is difficult for the corresponding UE to enter the power cycle based on the corresponding indicator.

According to the first implementation of the present disclosure, since a UE having a characteristic in which it is ultimately difficult to enter a power cycle is a UE capable of performing an NSSAA re-authentication procedure to the network when an NSSAA failure occurs, the UE may directly inform the network that it is a UE capable of the NSSAA re-authentication procedure, not 5GMM capability or radio capability. To this end, a UE having difficulty entering a power cycle may notify the network when transmitting a registration request message by adding the capability of a UE capable of NSSAA re-authentication procedure to the UE capabilities.

2. Second Implementation

According to the second implementation of the present disclosure, for a UE capable of NSSAA re-authentication procedure (i.e., a UE having difficulty entering a power cycle) or a general UE, a UE configuration method and inter-network related information use method when delivering a rejected NSSAI due to NSSAA failure may be proposed.

According to the second implementation of the present disclosure, when the first network node (e.g., AMF) receives an application error and an HTTP status code corresponding to the cause of the NSSAA failure when the NSSAA fails from the second network node (e.g., NSSAAF), depending on the code, even if an NSSAA failure occurs, the first network node may determine whether there is a possibility of success when the NSSAA procedure is performed again. More specifically, when the UE requesting registration is a UE capable of NSSAA re-authentication procedure, and the HTTP status code received from NSSAAF is 504 or 5xx, the AMF may determine that NSSAA failure has occurred due to a network problem.

Table 3 shows examples of application errors corresponding to the HTTP status code "504 gateway timeout". Application errors disclosed in Table 3 are merely examples, and application errors corresponding to the HTTP status code "504 gateway timeout" may include application errors not disclosed in Table 3.

TABLE 3

| Application Error | HTTP status code | Description |
|---|---|---|
| UPSTREAM_SERVER_ERROR | 504 Gateway Timeout | Error happens in reaching the remote peer (i.e., the AAA-S). |
| NETWORK_FAILURE | 504 Gateway Timeout | The request is rejected due to a network problem. |
| TIMED_OUT_REQUEST | 504 Gateway Timeout | No response is received from the remote peer (i.e., the AAA-S) when time out. |

According to the second implementation of the present disclosure, when AMF determines that NSSAA failure has occurred due to a network problem (i.e., the HTTP status code received from the NSSAAF is 504 or 5xx), the AMF may determine that the NSSAA failure is not an actual authentication failure, but a temporary NSSAA failure due to a network problem. In addition, the AMF may consider that there is a possibility that the NSSAA procedure will succeed if the NSSAA procedure is performed again.

According to the second implementation of the present disclosure, if the UE is a UE capable of NSSAA re-authentication procedure, and there is a possibility of success when performing the NSSAA procedure again even if NSSAA failure occurs (i.e., temporary NSSAA failure due to network problem), the AMF may inform the UE to perform the NSSAA procedure again for the corresponding network slice. Specifically, if the UE is capable of the NSSAA re-authentication procedure, and the HTTP status code received from the NSSAAF is 504 or 5xx, the AMF may provide the UE with time information indicating when the network slice corresponding to the rejected NSSAI may request network registration again, together with the rejected NSSAI. That is, the time information may implicitly indicate to the UE that the NSSAA procedure may be performed again for the corresponding network slice.

According to the second implementation of the present disclosure, if the UE is not capable of the NSSAA re-authentication procedure, the AMF may provide only the rejected NSSAI to the UE without time information indicating when the network slice corresponding to the rejected NSSAI may request network registration again upon NSSAA failure.

According to the second implementation of the present disclosure, if the HTTP status code received from the NSSAAF is not 504 or 5xx (e.g., "403 forbidden" or "404 not found"), the AMF may determine that even if the NSSAA procedure is performed again, it will fail in the same way as before. Therefore, if the HTTP status code received from the NSSAAF is not 504 or 5xx, the AMF may provide only the rejected NSSAI to the UE without time information indicating when the network slice corresponding to the rejected NSSAI may request network registration again upon NSSAA failure.

3. Third Implementation

According to the third implementation of the present disclosure, when the network determines that NSSAA failure has occurred due to a network problem, a method of providing a rejected NSSAI and back-off time information indicating when a network slice corresponding to the rejected NSSAI may request network registration again may be proposed.

Figure 14:
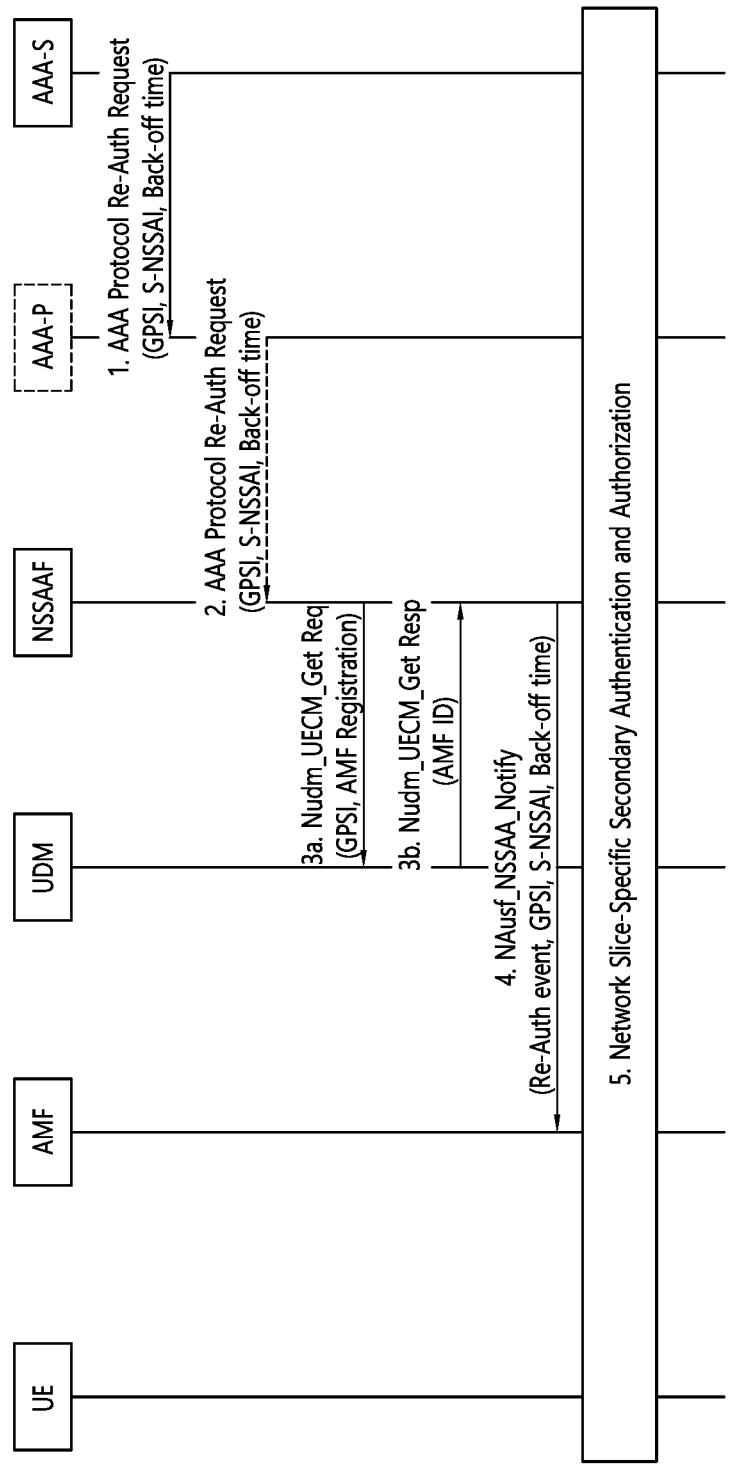
FIG. 14 shows an example of a method of providing back-off time information to which the third implementation of the present disclosure is applied.

FIG. 14 shows an example of a method of providing back-off time information to which the third implementation of the present disclosure is applied.

Referring to FIG. 14, although the basic structure is the same as the network slice-specific re-authentication and re-authorization procedure initiated by AAA-S described above in FIG. 10, back-off time information is transferred from the AAA-S to the AMF using AAA protocol re-authentication request message, Nudm_UECM get, and Nausf_NSSAA_Notify.

According to the third implementation of the present disclosure, when the AAA-S periodically performs the NSSAA procedure, the AAA-S may inform the NSSAAF of back-off time information to periodically perform the NSSAA. After determining which AMF to perform re-authentication again, the NSSAAF may deliver the back-off time information to the corresponding AMF so that the UE can perform the NSSAA procedure using the corresponding AMF.

According to the third implementation of the present disclosure, for a specific slice, when an NSSAA failure occurs, the AMF or UDM may store a time value at which network registration/access is possible after a specific time as a slice characteristic, and use the corresponding time value as the back-off time information.

According to the third implementation of the present disclosure, the value of the back-off time information may be 0, infinite, or a specific time value.

According to the third embodiment of the present disclosure, subsequent NSSAA procedures may follow the procedures of FIGS. 8 and 9 described above.

Figure 15:
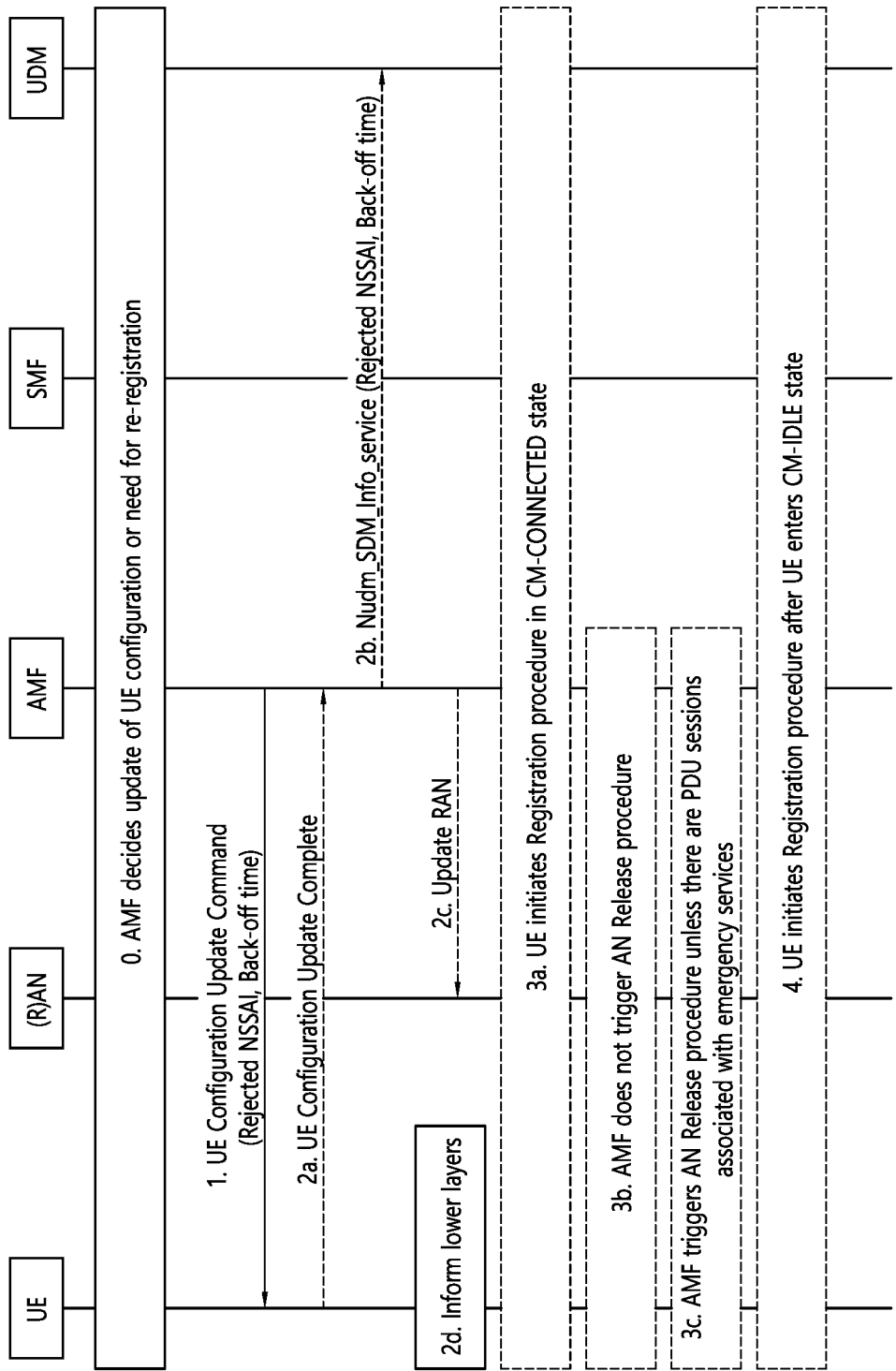
FIG. 15 shows an example of a UE configuration update procedure to which the third implementation of the present disclosure is applied.

FIG. 15 shows an example of a UE configuration update procedure to which the third implementation of the present disclosure is applied.

0. The AMF determines the need for configuration update or re-registration of the UE. For example, when an EAP failure occurs as a result of the NSSAA procedure, the AMF may determine to update the UE configuration for the S-NSSAI in which the EAP failure occurred. For example, if EAP success occurs as a result of the NSSAA procedure, the AMF may determine UE configuration update for the S-NSSAI in which EAP success occurred.

1. The AMF transmits a UE configuration update command message to the UE. Since the S-NSSAI of the network slice specific authentication result message is the HPLMN S-NSSAI, the AMF can change it to the serving S-NSSAI and transmit it to the UE when transmitting the UE configuration update command message.

The UE configuration update command message includes not only the S-NSSAI, but also back-off time information that allows the corresponding S-NSSAI to perform network registration/access after a predetermined time without performing network registration/access for a predetermined period of time or more. The back-off time information may be a value received from another network entity (e.g., received from the AAA-S as described above in FIG. 14) or may be a value set by the AMF itself. The back-off time information may be a value according to network configuration or may be a value according to a specific slice policy of the UE.

Table 4 shows an example of a UE configuration update command message including back-off time information according to the third implementation of the present disclosure.

TABLE 4

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Configuration update command message identity | Message type 9.7 | M | V | 1 |
| D- | Configuration update indication | Configuration update indication 9.11.3.18 | O | TV | 1 |
| 77 | 5G-GUTI | 5GS mobile identity 9.11.3.4 | O | TLV-E | 14 |

TABLE 4-continued

| IEI | Information Element | Type/Reference | Presence | Format | Length |
|---|---|---|---|---|---|
| 54 | TAI list | 5GS tracking area identity list 9.11.3.9 | O | TLV | 9-114 |
| 15 | Allowed NSSAI | NSSAI 9.11.3.37 | O | TLV | 4-74 |
| 27 | Service area list | Service area list 9.11.3.49 | O | TLV | 6-114 |
| 43 | Full name for network | Network name 9.11.3.35 | O | TLV | 3-n |
| 45 | Short name for network | Network name 9.11.3.35 | O | TLV | 3-n |
| 46 | Local time zone | Time zone 9.11.3.52 | O | TV | 2 |
| 47 | Universal time and local time zone | Time zone and time 9.11.3.53 | O | TV | 8 |
| 49 | Network daylight saving time | Daylight saving time 9.11.3.19 | O | TLV | 3 |
| 79 | LADN information | LADN information 9.11.3.30 | O | TLV-E | 3-1715 |
| B- | MICO indication | MICO indication 9.11.3.31 | O | TV | 1 |
| 9- | Network slicing indication | Network slicing indication 9.11.3.36 | O | TV | 1 |
| 31 | Configured NSSAI | NSSAI 9.11.3.37 | O | TLV | 4-146 |
| 11 | Rejected NSSAI | Rejected NSSAI 9.11.3.46 | O | TLV | 4-42 |
| 76 | Operator-defined access category definitions | Operator-defined access category definitions 9.11.3.38 | O | TLV-E | 3-n |
| F- | SMS indication | SMS indication 9.11.3.50A | O | TV | 1 |
| 6C | T3447 value | GPRS timer 3 9.11.2.5 | O | TLV | 3 |
| 75 | CAG information list | CAG information list 9.11.3.18A | O | TLV-E | 3-n |
| 67 | UE radio capability ID | UE radio capability ID 9.11.3.68 | O | TLV | 3-n |
| 68 | UE radio capability ID deletion indication | UE radio capability ID deletion indication 9.11.3.69 | O | TV | 1 |
| 44 | 5GS registration result | 5GS registration result 9.11.3.6 | O | TLV | 3 |
| 1B | Truncated 5G-S-TMSI configuration | Truncated 5G-S-TMSI configuration 9.11.3.70 | O | TLV | 3 |
| XX | Txxx value | GPRS timer 2 9.11.2.4 | O | TLV | 3 |

Referring to Table 4, the UE configuration update command message includes a "Txxx value" IE. This may correspond to the back-off time information. That is, the "Txxx value" IE may indicate back-off time information indicating when the network slice corresponding to the rejected NSSAI can request network registration again when NSSAA failure occurs for a UE having difficulty entering a power cycle. The "Txxx value" IE may be included in the UE configuration update command message only when the UE configuration update command message contains a rejected NSSAI with cause value "S-NSSAI not available due to failed or revoked NSSAA".

4. Fourth Implementation

According to the fourth implementation of the present disclosure, a method of operating a UE and a method of requesting network registration/access of a UE may be proposed for a UE receiving a rejected NSSAI due to NSSAA failure to attempt data transmission through a network slice corresponding to the rejected NSSAI.

According to the fourth implementation of the present disclosure, when the UE receives the back-off time information (e.g., the "Txxx value" IE described above in Table 4) together with the rejected NSSAI due to NSSAA failure, the UE may start a timer according to the back-off time information. If the UE receives a rejected NSSAI for a failed or revoked NSSAA with a cause value of "S-NSSAI not available due to a failed or revoked NSSAA" via the UE configuration update command message, the UE may start a timer by applying the back-off time information in the registered PLMN.

According to the fourth implementation of the present disclosure, the UE may store the S-NSSAI included in the rejected NSSAI in the rejected NSSAI while the timer is running, and delete the S-NSSAI from the rejected NSSAI when the timer expires. The rejected NSSAI may be stored in mobile equipment (ME) of the UE. While the S-NSSAI is stored in the rejected NSSAI, data associated with the S-NSSAI existing in the rejected NSSAI for the corresponding PLMN cannot be transmitted. Therefore, while the timer is running, data transmission through the network slice corresponding to the rejected NSSAI is impossible, and then, after the timer expires, data transmission may be possible by deleting the S-NSSAI from the rejected NSSAI.

According to the fourth implementation of the present disclosure, the timer may be applied to all S-NSSAIs included in the rejected NSSAI for failed or revoked NSSAA in the UE configuration update command message. For example, if the rejected NSSAI in the UE configuration update command message include S-NSSAI #1 and S-NSSAI #2, the timer may be applied for S-NSSAI #1 and S-NSSAI #2.

According to the fourth implementation of the present disclosure, when the UE receives a new allowed NSSAI or a new configured NSSAI from the network, if there is an S-NSSAI in the allowed NSSAI or the configured NSSAI that is the same as the S-NSSAI stored in the rejected NSSAI for the failed or revoked NSSAA in the previously received UE configuration update command message, the UE may stop the timer associated with the corresponding S-NSSAI.

According to the fourth implementation of the present disclosure, since the UE deletes the S-NSSAI from the rejected NSSAI when the timer expires, the S-NSSAI may be included in the requested NSSAI when requesting network registration/access later. If the S-NSSAI exists in the requested NSSAI, the network may determine that the UE requests network registration/access to use the network slice corresponding to the S-NSSAI, and allocate a network slice for the S-NSSAI.

More specifically, upon expiry of the timer, if the UE received the S-NSSAI included in the rejected NSSAI for the failed or revoked NSSAA with cause value "S-NSSAI not available due to a failed or revoked NSSAA" via the UE configuration update command message, and the UE has stored the S-NSSAI in the rejected NSSAI, the UE may delete the S-NSSAI included in the rejected NSSAI for failed or revoked NSSAA from the stored rejected NSSAI for registered PLMNs for all access types.

5. Fifth Implementation

According to the fifth implementation of the present disclosure, an operation of the UE after the timer expires may be proposed.

According to the fifth implementation of the present disclosure, after the timer expires, the UE may delete the S-NSSAI included in the rejected NSSAI from the rejected NSSAI and transmit a registration request message to the network by including the S-NSSAI in the requested NSSAI when performing a network access request for a new network slice. The network receiving the registration request message may determine whether to perform NSSAA again for the S-NSSAI present in the requested NSSAI. After determining that NSSAA is to be performed again, the NSSAA procedure may be performed again, and then the network may notify the UE of the S-NSSAI in the form of an allowed NSSAI or a rejected NSSAI through a UE configuration update command message. If the S-NSSAI is transmitted to the UE through the allowed NSSAI, the UE may transmit a PDU session establishment request message to the network to establish a PDN session and transmit data when data transmission is required later.

Various implementations of the present specification described above may operate individually, or one or more may be combined to operate in a compound manner.

The present disclosure can have various advantageous effects.

For example, for a UE that is difficult to recover from errors by initializing the UE itself because it is difficult to turn off the power or release the USIM due to the nature of the device, error recovery can be possible for S-NSSAI rejected due to temporary NSSAA failure.

For example, even if NSSAA fails once, since the rejected S-NSSAI can be used again after a certain time, data transmission can be possible using the S-NSSAI for which NSSAA failed once without moving to a new PLMN.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
    transmitting a registration request message including first requested network slice selection assistance information to an access mobility management node,
    wherein the first requested network slice selection assistance information includes single network slice selection assistance information corresponding to a network slice with which a user equipment (UE) intends to register;
    receiving a configuration update command message including first rejected network slice selection assistance information from the access mobility management node,
    wherein the first rejected network slice selection assistance information includes the single network slice selection assistance information based on a failure of a network slice-specific authentication and authorization for the single network slice selection assistance information,
    wherein the configuration update command message further includes time information related to a timer based on i) the failure of the network slice-specific authentication and authorization for the single network slice selection assistance information, and ii) the UE being a specific type of device, and
    wherein the specific type of device is a device capable of performing a network slice-specific re-authentication based on a power of the UE not being able to be turned off;
    storing the single network slice selection assistance information to a second rejected network slice selection assistance information;
    starting the timer based on the time information; and
    after the timer expires, deleting the single network slice selection assistance information stored in the second rejected network slice selection assistance information.

2. The method of claim 1, wherein information related to the specific type of device is included in the registration request message.

3. The method of claim 1, wherein the failure of the network slice-specific authentication and authorization for the single network slice selection assistance information is a failure due to a problem of a network.

4. The method of claim 3, wherein the failure due to the problem of the network corresponds to a hypertext transfer protocol (HTTP) status code, delivered from a network slice-specific authentication and authorization node, being "504 gateway timeout" and/or "5xx".

5. The method of claim 1, wherein, after the timer expires, a second registration request message including second requested network slice selection assistance information including the single network slice selection assistance information is transmitted to the access mobility management node.

6. The method of claim 5, wherein, based on success of the network slice-specific authentication and authorization for the single network slice selection assistance information, an allowed network slice selection assistance information including the single network slice selection assistance information is received from the access mobility management node.

7. The method of claim 1, wherein the time information is transmitted from an authentication, authorization and accounting server (AAA-S) to the access mobility management node via a network slice-specific authentication and authorization node.

8. The method of claim 1, wherein the time information is stored in the access mobility management node or a unified data management (UDM) as a usable network slice characteristic for the failure of the network slice-specific authentication and authorization for the single network slice selection assistance information.

9. The method of claim 1, wherein the method is performed by the UE in communication with at least one of a mobile device, a network, and/or autonomous vehicles other than the UE.

10. A user equipment (UE) comprising:
at least one transceiver;
at least one processor; and
at least one memory operably connectable to the at least one processor and storing instructions that, based on being executed by the at least one processor, perform operations comprising:
transmitting a registration request message including first requested network slice selection assistance information to an access mobility management node,
wherein the first requested network slice selection assistance information includes single network slice selection assistance information corresponding to a network slice with which the UE intends to register;
receiving a configuration update command message including first rejected network slice selection assistance information from the access mobility management node,
wherein the first rejected network slice selection assistance information includes the single network slice selection assistance information based on a failure of a network slice-specific authentication and authorization for the single network slice selection assistance information,
wherein the configuration update command message further includes time information related to a timer based on i) the failure of the network slice-specific authentication and authorization for the single network slice selection assistance information, and ii) the UE being a specific type of device, and wherein the specific type of device is a device capable of performing a network slice-specific re-authentication based on a power of the UE not being able to be turned off;
storing the single network slice selection assistance information to a second rejected network slice selection assistance information;
starting the timer based on the time information; and
after the timer expires, deleting the single network slice selection assistance information stored in the second rejected network slice selection assistance information.

11. The UE of claim 10, wherein information related to the specific type of device is included in the registration request message.

12. The UE of claim 10, wherein the failure of the network slice-specific authentication and authorization for the single network slice selection assistance information is a failure due to a problem of a network, and
wherein the failure due to the problem of the network corresponds to a hypertext transfer protocol (HTTP) status code, delivered from a network slice-specific authentication and authorization node, being "504 gateway timeout" and/or "5xx".

13. The UE of claim 10, wherein, after the timer expires, a second registration request message including second requested network slice selection assistance information including the single network slice selection assistance information is transmitted to the access mobility management node, and
wherein, based on success of the network slice-specific authentication and authorization for the single network slice selection assistance information, an allowed single network slice selection assistance information including the single network slice selection assistance information is received from the access mobility management node.

14. A processing apparatus, configured to control a wireless device, comprising:
at least one processor; and
at least one memory operably connectable to the at least one processor,
wherein the at least one processor is adapted to perform operations comprising:
generating a registration request message including first requested network slice selection assistance information,
wherein the first requested network slice selection assistance information includes single network slice selection assistance information corresponding to a network slice with which the processing apparatus intends to register;
obtaining a configuration update command message including first rejected network slice selection assistance information,
wherein the first rejected network slice selection assistance information includes the single network slice selection assistance information based on a failure of a network slice-specific authentication and authorization for the single network slice selection assistance information,
wherein the configuration update command message further includes time information related to a timer based on i) the failure of the network slice-specific authentication and authorization for the single network slice selection assistance information, and ii) the UE being a specific type of device, and wherein the specific type of device is a device capable of performing a network slice-specific re-authentication based on a power of the UE not being able to be turned off;
storing the single network slice selection assistance information to a second rejected network slice selection assistance information;
starting the timer based on the time information; and
after the timer expires, deleting the single network slice selection assistance information stored in the second rejected network slice selection assistance information.

* * * * *